United States Patent
Pizzo et al.

(10) Patent No.: US 8,783,973 B2
(45) Date of Patent: *Jul. 22, 2014

(54) HAND HELD CAMERA MOUNT

(75) Inventors: Stephen Pizzo, Los Angeles, CA (US); Hector Ortega, Los Angeles, CA (US)

(73) Assignee: Truality, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,188

(22) Filed: Jul. 9, 2012

(65) Prior Publication Data

US 2013/0071100 A1   Mar. 21, 2013

Related U.S. Application Data

(63) Continuation of application No. 13/374,964, filed on Jan. 25, 2012, now abandoned, which is a continuation of application No. 12/653,787, filed on Dec. 18, 2009, now Pat. No. 8,128,295.

(60) Provisional application No. 61/203,135, filed on Dec. 19, 2008.

(51) Int. Cl.
*G03B 17/00*   (2006.01)

(52) U.S. Cl.
USPC ........ 396/420; 396/428; 348/373; 248/187.1; 248/257; 248/258

(58) Field of Classification Search
USPC ......... 396/419, 420, 422, 425, 428, 421, 423; 348/373, 376; 248/177.1, 187.1, 188.5, 248/257, 178.1, 258; 294/139
See application file for complete search history.

(56) References Cited

U.S. PATENT DOCUMENTS

| | | | |
|---|---|---|---|
| 2,945,428 A * | 7/1960 | Dearborn | 396/421 |
| 3,006,052 A | 10/1961 | Stickney | |
| 3,126,187 A | 3/1964 | Mooney | |
| 3,737,130 A | 6/1973 | Shiraishi | |
| 3,767,095 A | 10/1973 | Jones | |
| 4,943,820 A | 7/1990 | Larock | |
| 4,963,904 A * | 10/1990 | Lee | 396/423 |
| 6,056,449 A * | 5/2000 | Hart | 396/421 |
| 6,068,223 A * | 5/2000 | Navarro | 248/187.1 |
| 7,191,923 B1 * | 3/2007 | Kundig | 224/257 |
| 8,128,295 B2 * | 3/2012 | Pizzo et al. | 396/420 |

FOREIGN PATENT DOCUMENTS

GB   2425185 A   10/2006

OTHER PUBLICATIONS

International Search Report for PCT/US2009/006690 mailed Mar. 10, 2010 in 2 pages.

* cited by examiner

*Primary Examiner* — Clayton E Laballe
*Assistant Examiner* — Warren K Fenwick
(74) *Attorney, Agent, or Firm* — Knobbe, Martens, Olson & Bear LLP

(57) ABSTRACT

A hand held camera unit comprises a shoulder assembly and a platform assembly for releasably holding a camera. A connector is provided between the shoulder assembly and the platform assembly, and is movable between a locked position wherein the platform assembly is fixed relative to the shoulder assembly and an unlocked position wherein the platform assembly can be selectively moved relative to the shoulder assembly in the roll axis, the yaw axis and in a fore and aft direction.

17 Claims, 35 Drawing Sheets

FIG·12

HAND HELD CAMERA MOUNT

CROSS REFERENCE TO RELATED APPLICATIONS

This application is a continuation of patent application Ser. No. 13/374,964 filed Jan. 25, 2012 which is a continuation of patent application Ser. No. 12/653,787 filed Dec. 12, 2009, which claims the benefit of U.S. Provisional Patent Application No. 61/203,135 filed Dec. 19, 2008, and which is incorporated herein by reference in its entirety.

FIELD AND BACKGROUND OF THE INVENTION

This invention relates to a hand held camera mount which is typically used for mounting on the shoulder of the operator of the camera. Generally, the term "hand-held" refers to the device used to hold a film camera steady on the shoulder of the camera operator. The majority of the weight of the film camera is then supported by the shoulder. The unit may have mounted thereon a shoulder pad which serves to reduce stress on the shoulder from the camera body. This shoulder pad is preferably in a fixed position and a few allow the pad to compress to better fit the shoulder. The shoulder pad is connected to the main body of the "hand-held" unit, which may be attached to the bottom of any ARRI film or other camera. The make of the film camera is not important because most are interchangeable. Protruding from the front of the hand held unit are handgrips, attached by stalks to the unit. These protrude forward of the body so that the camera operator can support the front end of the weight of the camera with his hands. These handles are also used to guide the location of the lens of the film camera.

SUMMARY OF THE INVENTION

According to one aspect of the invention, there is provided a hand held camera unit comprising: a shoulder assembly; a platform assembly for releasably holding a camera; and a connector mechanism between the shoulder assembly and the platform assembly, the connector mechanism being movable between a locked position wherein the platform assembly is fixed relative to the shoulder assembly and an unlocked position wherein the platform assembly can be selectively moved relative to the shoulder assembly in the roll axis, the yaw axis and in a fore and aft direction.

Preferably, a handle assembly is attached to the platform assembly for moving the platform assembly relative to the shoulder assembly. The handle assembly may comprise a center handle selectively attached to the platform assembly, a pair of lateral handles extending from the center handle and movable relative thereto, and a handle grip attached to each of the lateral handles and movable relative thereto, the handle grips for holding by an operator of the unit. The grip handle may be attached to the lateral handles in a manner which enables it to rotate in both the vertical and horizontal axes and also to rotate about its axis. The lateral handles may telescope so that they can be extended or retracted to a desired length.

The shoulder assembly may comprise a substantially rigid shoulder frame configured to fit over the shoulder of an operator and a softer shoulder pad thereon for the comfort of the operator.

Preferably, the platform assembly comprises a generally flat rectangular dovetail member, the platform assembly having a curved recess therein, the curved recess having an elongate slot, the curved recess and elongate slot receiving and cooperating with the connector mechanism to effect operation between the locked position and the unlocked position.

In one embodiment, the connector mechanism comprises a base member fastened to the shoulder assembly, a lower plate member above the base member and having an upper surface which engages the platform assembly on one side thereof, an upper plate member above the lower plate member, the platform assembly being sandwiched between the lower plate member and the upper plate member, and locking means for selectively tightening and loosening the lower plate member and upper plate member relative to each other such that the platform assembly is movable relative to the shoulder assembly when the lower and upper plate members are loosened and the platform assembly is fixed relative to the shoulder assembly when the lower and upper plate members are tightened.

In another form, the connector mechanism may comprise a base member fastened to the shoulder assembly, a lower plate member above the base member and having a concave upper surface which engages the curved recess of the platform assembly on one side thereof, an upper plate member above the lower plate member and having a convex surface which engages the curved recess of the platform assembly on the opposing side thereof to that of the lower plate member, the curved recess of the platform assembly being sandwiched between the lower plate member and the upper plate member. A locking means may be provided for selectively tightening and loosening the lower plate member and upper plate member relative to each other such that the platform assembly is movable relative to the shoulder assembly when the lower and upper plate members are loosened and the platform assembly is fixed relative to the shoulder assembly when the lower and upper plate members are tightened. The locking means may comprise a screw having a splined head which can be tightened to achieve the locked position and loosened to achieve the unlocked position.

In one embodiment, a lock lever is provided having a splined aperture, the splined aperture engaging the splined head of the screw whereby appropriate movement of the lock lever rotates the screw to achieve the locked position and the unlocked position respectively.

A spring may be provided between the lower plate member and the upper plate member for urging the lower and upper plate members away from each other when in the unlocked position to facilitate movement of the platform assembly relative to the shoulder assembly.

According to another aspect of the invention, there is provided a hand held camera unit comprising: a shoulder assembly; a platform assembly for releasably holding a camera; a handle assembly attached to the platform assembly for manipulating the platform assembly relative to the shoulder assembly; and a connector mechanism for controlling relative movement between the shoulder assembly and the platform assembly, the connector mechanism being operable between a locked position wherein the platform assembly is fixed relative to the shoulder assembly and an unlocked position wherein the platform assembly can be selectively moved relative to the shoulder assembly in any one or more of the roll axis, the yaw axis and in a fore and aft direction.

Most film production units on the market that are used for the manual carrying of "hand-held" assisted cameras are single angle shoulder mounts. This means that no matter what the size of the shoulder, the angle, or the ingress, it is always the at same angle on the shoulder pad. In certain shooting conditions this means that the edge of the pad, and all the weight of the camera, is absorbed on one edge of the shoulder causing great discomfort and fatigue to the camera operator.

During hand held shoots, this can be responsible for numerous shooting delays in order to give the camera operator time to rest.

The present invention addresses these issues in at least three ways. First, the hand held camera mount of the invention has been designed with a shoulder pad mounting system that allows for movement along the horizontal axis. This allows the camera operator's body to remain generally stationary while the hands, head and camera are allowed to move from side to side.

Second, the hand held camera mount of the invention may have a pivoting gimbal and sliding rosette with a thumb lock mounted to the shoulder pad, allowing the camera operator to rotate the camera along its lens axis. This gives the operator freedom to contort the body for a sought after shot while still being able to keep the camera along the horizontal plane, all while the shoulder pad is firmly in place, squarely on the shoulder.

Third, the hand held camera mount of the invention may add a telescoping extension to the stalks that connect to the handgrips. This allows the camera operator to extend the length of the handles and also creates a pivot point so that a more relaxing angle can be found for the wrists.

The shoulder pad and dovetail or camera platform, which directly connects to the mounting plate (bridgeplate) of the camera, are preferably connected by a low-profile double axis gimbal that allows adjustment in pan and roll (side to side, up and down) as well as a fore and aft directions, independent of the dovetail/bridgeplate connection. The pan angle may be set before the camera goes on the shoulder while the roll angle or horizon can be easily set with the fully configured camera on the camera operator's shoulder. It is convenient enough to be fine tune adjusted between takes. The biggest impact of these additional adjustments is felt in terms of fatigue and endurance. A fully dressed camera operator is likely to stay comfortable for a much longer period of time.

The variable relationship between the shoulder pad and the dovetail/bridgeplate is an important feature of the present invention. Some systems offer the ability to balance the camera fore and aft while on the shoulder. Since the shoulder has some amount of downward slope, some systems have some angle built into the shoulder pad to help keep the camera level. The problem is that body types differ and the shoulder angle can vary dramatically from operator to operator. This causes many operators to hold the camera level while trying to compose the frame and pay attention to moving. Rather than letting the shoulder pad settle on the shoulder into a stable equilibrium, the operator may constantly be applying a torque in the roll axis to hold the horizon. As soon as the operator makes a direction change, the amount of torque required to level the camera changes and the frame tips in one direction or the other. This makes any camera feel top heavy and unstable and is one of the main reasons operators have always placed such an emphasis on making the camera's CG (center of gravity) as low as possible. The present invention allows a variable angle of the shoulder pad, making it possible to adjust the angle so the weight of the camera package would settle into a very stable equilibrium with a level horizon.

Our research has shown that in addition to the varying downward slope of the human shoulder, there is also a varying amount of forward rotation of the shoulders, and that when an operator stands straight and looks forward, the camera's LOS (line-of-sight) actually crosses the operator's LOS. To compensate, many operators actually pan their upper body or entire body slightly, relative to their direction of travel. By offsetting the angle (pan axis) of the shoulder pad relative to the camera, the present invention can make the camera's LOS and the operator's LOS substantially parallel without any neck or torso twisting or side-stepping.

Other preferable features of the hand-held unit of the present invention include the rosette cross bar. Located at the front of the dovetail or camera platform, it is adjustable side-to-side as well as rotationally. The clamp that holds the cross bar in place, and prevents unwanted pivoting between the shoulder pad and the dovetail, is very strong and can support, for example, a fully loaded Panavision GII with 1000 feet of film and a 4:1 zoom. For those who like a more traditional approach, the rosette cross bar and clamp of the present invention can be quickly removed from the dovetail and attached to any universal mount.

The hand-held unit of the present invention may be compatible with all ARRI-style bridge plates making its appeal an industry wide. The rosette of the present invention also follows the ARRI standard so other handles can be used. There may be a telescopic version that may start at roughly 7.5" in length and increase to 12" fully extended with a safety mechanism preventing the inner and outer tubes from separating haphazardly. This embodiment will also provide the ability to rotate the handle about the telescopic axis. If 12" of extension is not enough then a "dog bone" or any other ARRI-style rosette based handle accessory could be added. The hand held unit of the present invention may have various handles that will provide a dock for the View Factor Origo as well as cable management. Further, the hand held mount of the present invention may also work to ensure compatibility with the "Super Grip" as well as the Micro Force and the Oppenheimer Rock N Roll handle making the unit of the present invention a significantly versatile and configurable hand held system.

Further of significance is the strength of the spring in the rosette for the gimbal and how it allows the dovetail to float allowing for very easy rotating when released.

The hand held system of the invention combines innovative design with exceptional workmanship and materials. Features include: a dovetail interface which allows quick setup, which may be 20 seconds from tripod to hand held; multi axis adjustment allowing the shoulder pad to conform to any shoulder; two axis (rotational) adjustment shoulder pad; fore/aft linear adjustment shoulder pad; full compatibility with Arriflex style bridge plates; utilization of conventional bicycle grips; telescopic and rotating handle extensions; handles and extensions which may use Arriflex compatible rosettes; and a mounting point for ViewFactor Origo remote start/stop button. The above may be available as a system or a la carte.

The mount of the invention may use standard bicycle style grips on rosette mounted handles. These handles include a home for the Origo remote start button and may be connected to the rosette cross bar with telescopic handle extensions that range from 8" to 14" in length.

The rosette cross bar at the front of the dovetail or platform may be adjustable side to side as well as rotationally. The clamp that holds it in place is preferably very strong and can support a fully loaded ArriCam with 1000' of film and a 5:1 zoom. For those who like a more traditional approach, our rosette cross bar and clamp can be quickly removed from the dovetail and attached to a universal mount on the iris rods.

The unit of the invention preferably allows each operator to position the handles and shoulder pad in a neutral position, comfortable for their shooting style and body type. The shoulder pad is adjustable in two axes: yaw (Pan) and roll. Both of these movements may be locked and unlocked by means of a locking lever between the shoulder pad and dovetail or platform. Before mounting the camera, the locking lever is unlocked and the unit placed on the shoulder. The handles and extensions are adjusted (extended and rotated) so that they are in a comfortable preliminary position. With the unit on the shoulder, the direction the dovetail is pointing relative to the forward looking LOS (Line Of Sight) is observed. Generally, when looking forward, the shoulder mounted dovetail may be pointing at an angle 7 to 20 degrees across operator LOS. By releasing the shoulder pad locking lever, it is possible to pan the dovetail up to 25 degrees (or more) clockwise so that the dovetail (and camera) and operator LOS are parallel. Once an angle that suits the operator is established, the locking lever is locked.

It is possible to adjust the roll axis of the handheld mount with the camera mounted and on the shoulder and this is recommended for the best fit. The unit mounts to the camera using the Arri style, or other type, bridge plate. Simply slide the camera off the dovetail on the tripod head and on to the handheld mount's lightweight dovetail. Then lock the bridge plate lever. Once the camera is on the shoulder, the locking lever can be unlocked and the camera leveled to the horizon by pushing up or down on the right and left hand grips. By viewing the LCD or EVF, the operator can match the frame to the horizon while resting the shoulder pad in the most comfortable position on the shoulder. When the level is satisfactory, the locking lever is locked. The last adjustment between the shoulder pad and dovetail is a fore or aft linear adjustment which replicates the movement between the bridge plate and dovetail. For most configurations it should start somewhere between full forward and half way.

The yaw (Pan) adjustment may be most easily executed before the camera is mounted to the unit of the invention. The yaw adjusting components may be comprised of two spring loaded custom rosettes. When there is no weight on the system and the lock lever is unlocked, a spring forces the two rosettes apart which allow the shoulder pad frame and dovetail or camera platform to rotate relative to each other in the yaw axis. When the camera is mounted and its weight is loading the system, the same locking lever will only permit the shoulder pad frame to rotate in the roll axis.

DETAILED DESCRIPTION OF THE INVENTION

Figure 1:
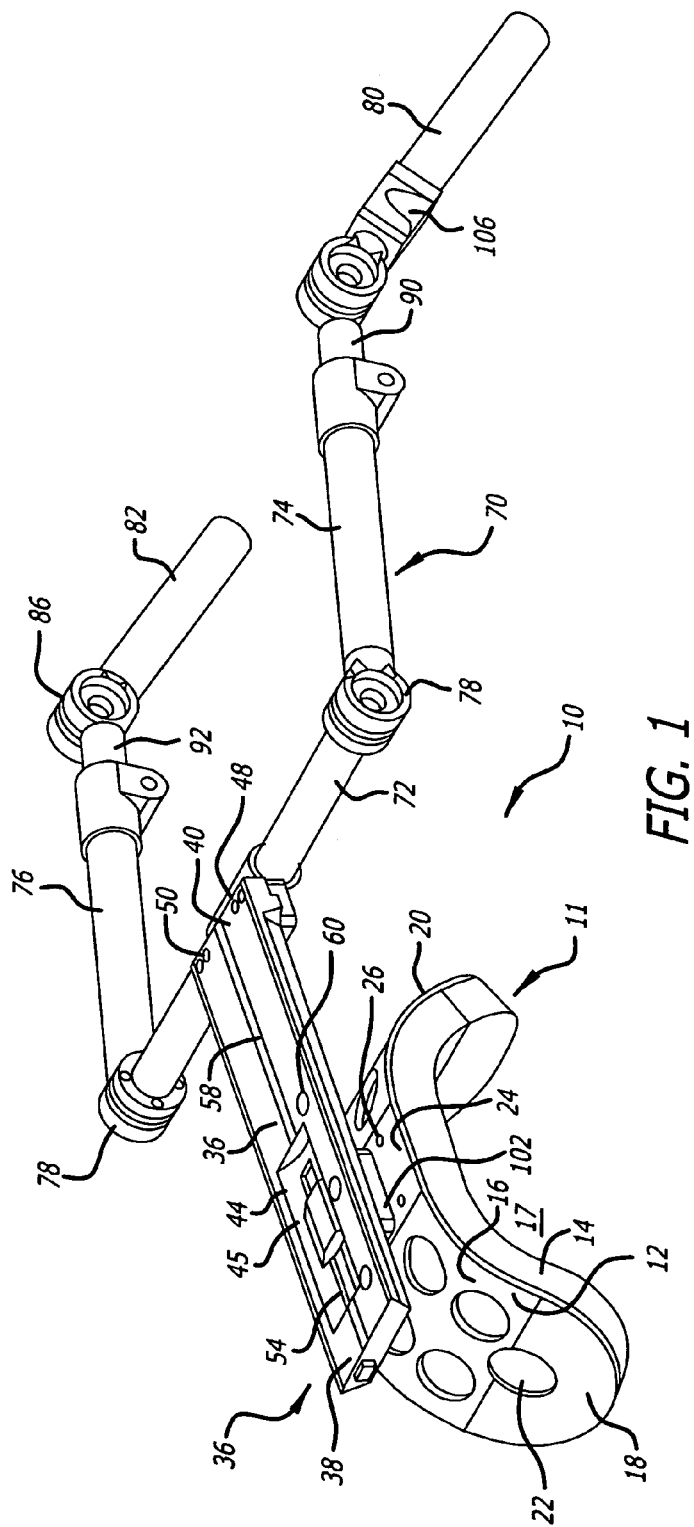
FIG. 1 is a rear perspective view of a hand held camera unit in accordance with one aspect of the invention.

Reference is now made to the accompanying drawings which show an embodiment of one aspect of the hand-held camera unit 10 in accordance with the invention.

The hand-held camera unit 10 comprises a shoulder assembly 11, a dove-tail assembly or platform 36 and a connector mechanism 102 by means of which the shoulder assembly 11 and the dovetail assembly or camera platform 36 are not only held together, but are oriented with respect to each other in any number of different positions to suit the comfort, convenience and technical requirements of the operator.

The shoulder assembly 11 comprises a shoulder frame 12 and a shoulder pad 14 connected to the underside thereof. The shoulder pad 14, being comprised of a softer material, rests on the shoulder of the operator. The shoulder frame 12 comprises a center portion 16 and side portions 18 and 20. The side portions 18 and 20 are angled with respect to the center portion 16 so as to create a shoulder space 17 in which the shoulder of the operator is received.

The center portion 16 includes a connector plate 24 with a plurality of connector holes 26, the connector mechanism 102 being secured thereto on the one hand, and to the dovetail assembly 36 on the other, as will be described below.

The shoulder frame 12 has a number of holes 22, making it more efficient in that the frame will be lighter and may also offer breathing spaces without compromising the integrity of the should frame 12 itself.

With reference to the dovetail assembly 36, this is generally a substantially rectangular, flat, plate-like structure having a front end 40 and a rear end 38. The upper surface of the dovetail assembly 36 includes a track 58 and mounting holes 60. The dovetail assembly 36 is designed so as to receive any number of different types of cameras so that the camera can be releasably and efficiently attached thereto in a quick operation.

The dovetail assembly 36 has on its upper surface a curved recess 44 of generally concave shape. A slot 54 extends along most of the length of the curved recess 44. The curved recess 44 defines a generally concave surface 45. It will be seen, as described later, that the connector mechanism 102 engages through the slot 54 with the concave surface 45 of the curved recess 44.

A handle assembly 70 is attached to the front end 40 of the dovetail assembly 36, and a handle clamp 48 is located at the front end 40 of the dovetail assembly 36 in order to receive the handle assembly 70. Handle clamp bolts 50 are provided at the front end 40, and the position of the handle assembly 70 can be varied within the handle clamp 48, in a manner that allows it to rotate about its axis, and also slide from side to side within the handle clamp 48.

The handle assembly 70 comprises a center handle 72, which is engaged by the handle clamp 48. At each end of the center handle 72, there is located a handle joint 78, and the handle joint 78 joins lateral handles 74 and 76 to the respective ends of the center handle 72. The handle joints 78 allow movement of the lateral handles 74 and 76 relative to the center handle 72, at least by being rotatable relative thereto.

Figure 7:
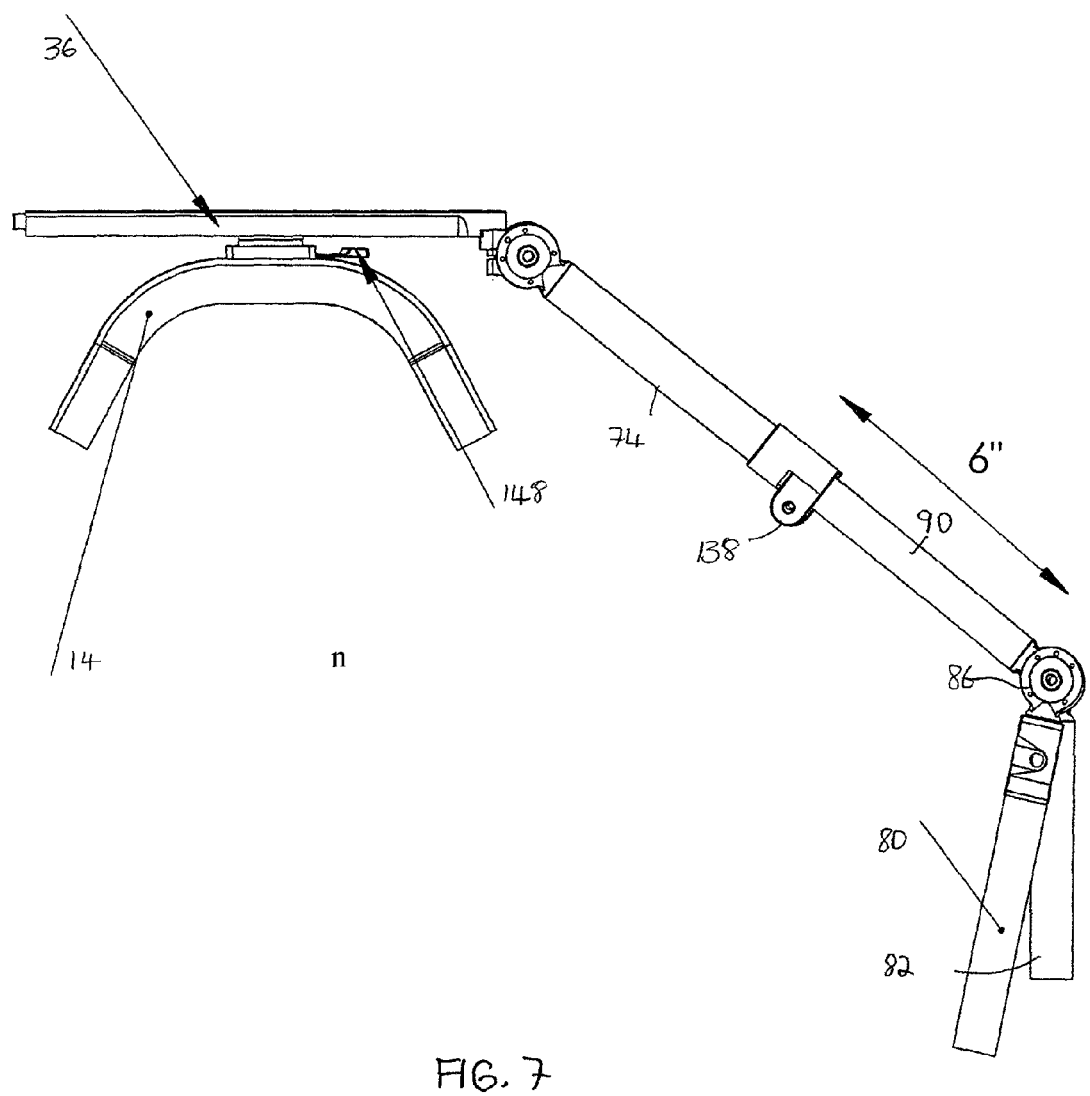
FIG. 7 is a right side view of the hand held camera unit of the invention shown in FIG. 1 of the drawings, shown with the telescoping handle in the extended position.

Each lateral handle 74 and 76 may be of a telescoping type, and a handle telescope 90 and 92 may be provided so that the length of the lateral handle 74 and 76 can be expanded or reduced, depending upon the requirements and preferences of the operator. In FIG. 7 of the drawings, the handle telescopes 90 and 92 are shown, in this case with a 6-inch expansion capacity, although the invention is not limited to such expansion dimensions.

Each of the lateral handles has at its ends a handle joint 86, and the handle joint 86 is connected to handle grips 80 and 82, which are those parts of the handle assembly grasped by the operator, and used for maneuvering and controlling the handheld camera unit 10. Note that at least one of the handle grips 80 has an origo mount thereon.

Figure 2:
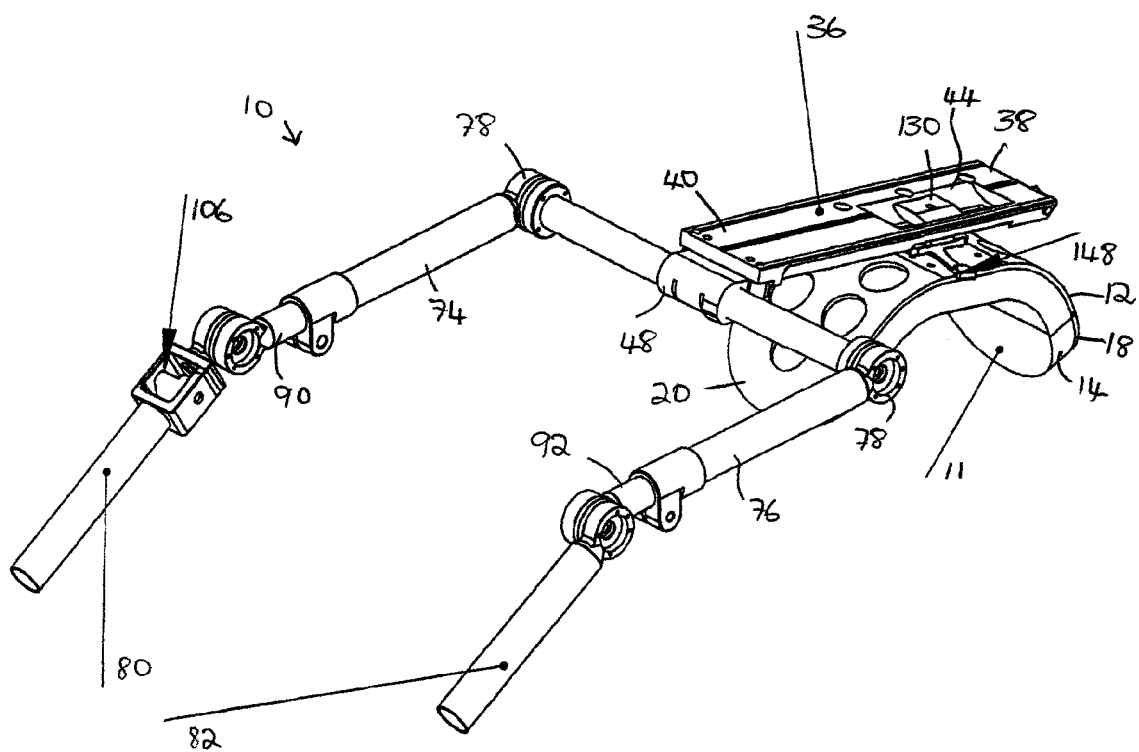
FIG. 2 is a front perspective view of the hand held camera unit of the invention shown in FIG. 1 of the drawings.
Figure 3:
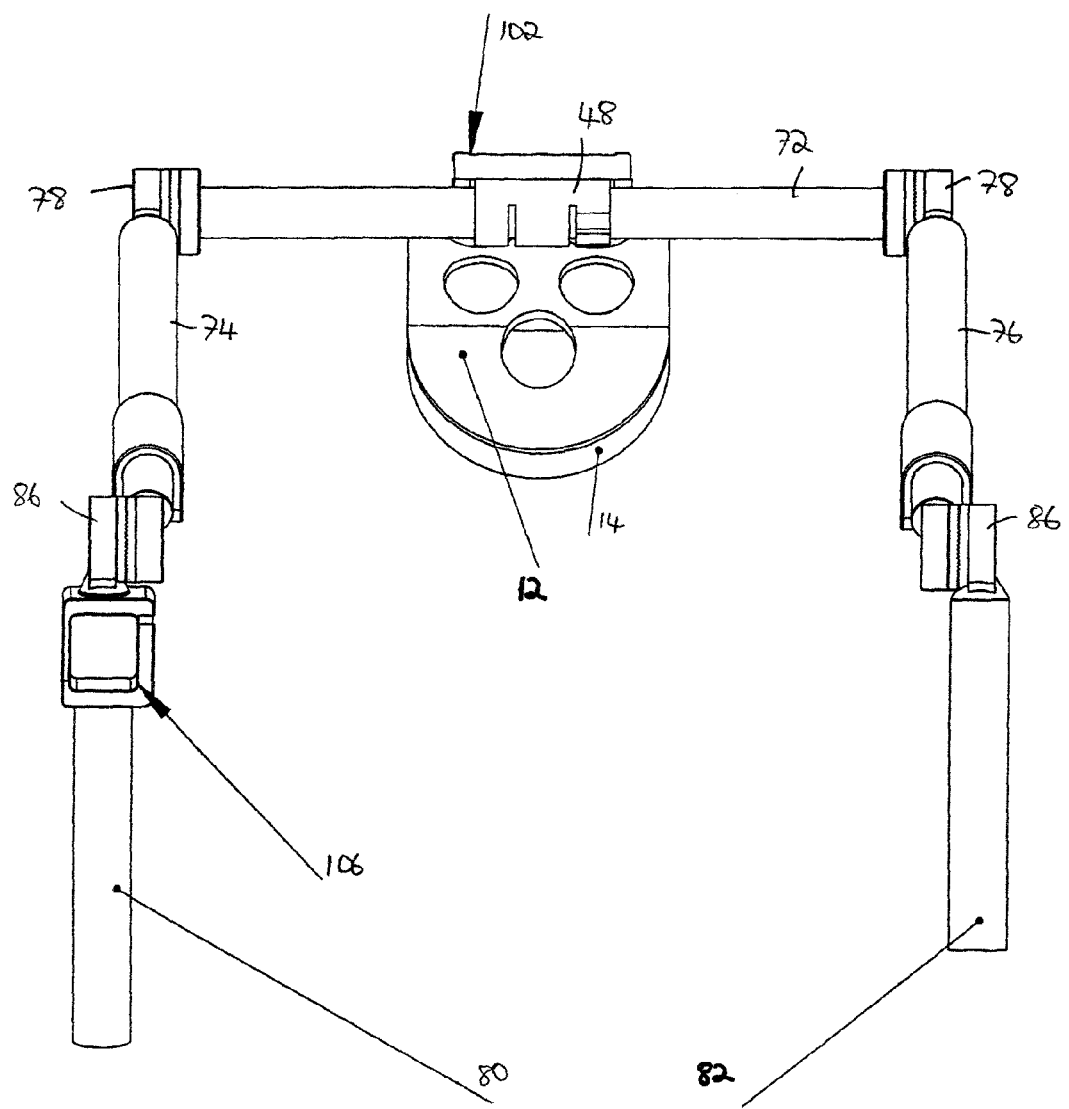
FIG. 3 is a front view of the hand held camera unit of the invention shown in FIG. 1 of the drawings.

FIG. 1 of the drawings shows a rear perspective view of the hand-held camera unit 10 as described above, while FIG. 2 of the drawings shows a front perspective view of the hand-held camera unit 10. In FIG. 3 of the drawings, the hand-held camera mount is shown from a front view perspective, and it will be seen that the handle clamp 48 can be adjusted so as to tightly engage or disengage the center handle 72, so that it can be rotated about its axis, or moved from side to side within the clamp 48, to suit the preferences and needs of the operator.

Figure 4:
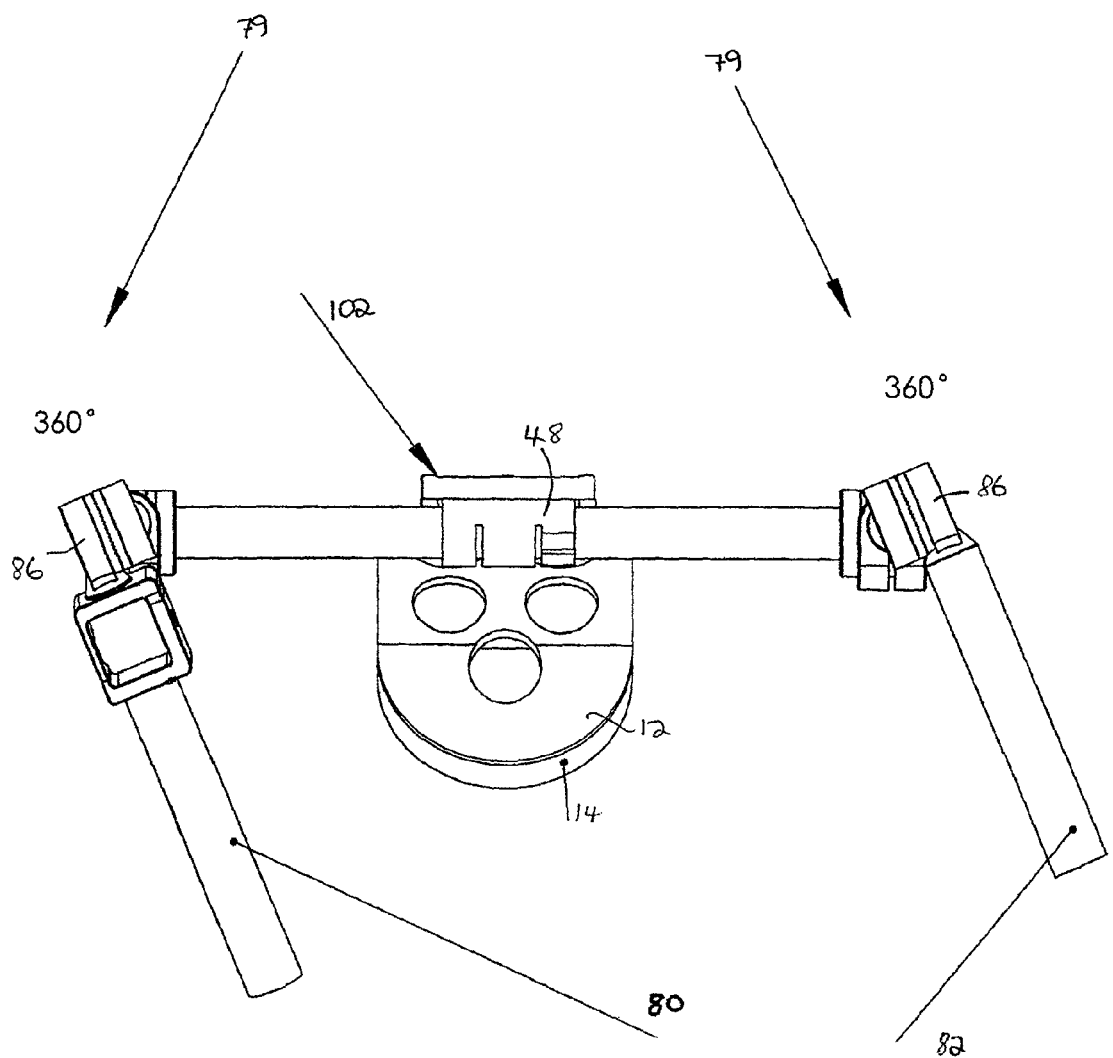
FIG. 4 is a front view of the hand held camera unit of the invention shown in FIG. 3 of the drawings with the handles in an alternative position.

In FIG. 4 of the drawings, there is shown a view of the hand-held camera unit 10 as shown in FIG. 3, from a front perspective, but wherein the handle grips 80 and 82 have been rotated about the handle joints 86. It will be appreciated that the handle grips can be rotated through 360°, designated by arrows 79, about the handle joint 86, and that rotation is possible in both a clockwise and counter-clockwise direction. Moreover, each handle grip 80 and 82 may be rotated in different directions and by different amounts, once more to suit the needs and exigencies of the situation.

Figure 5:
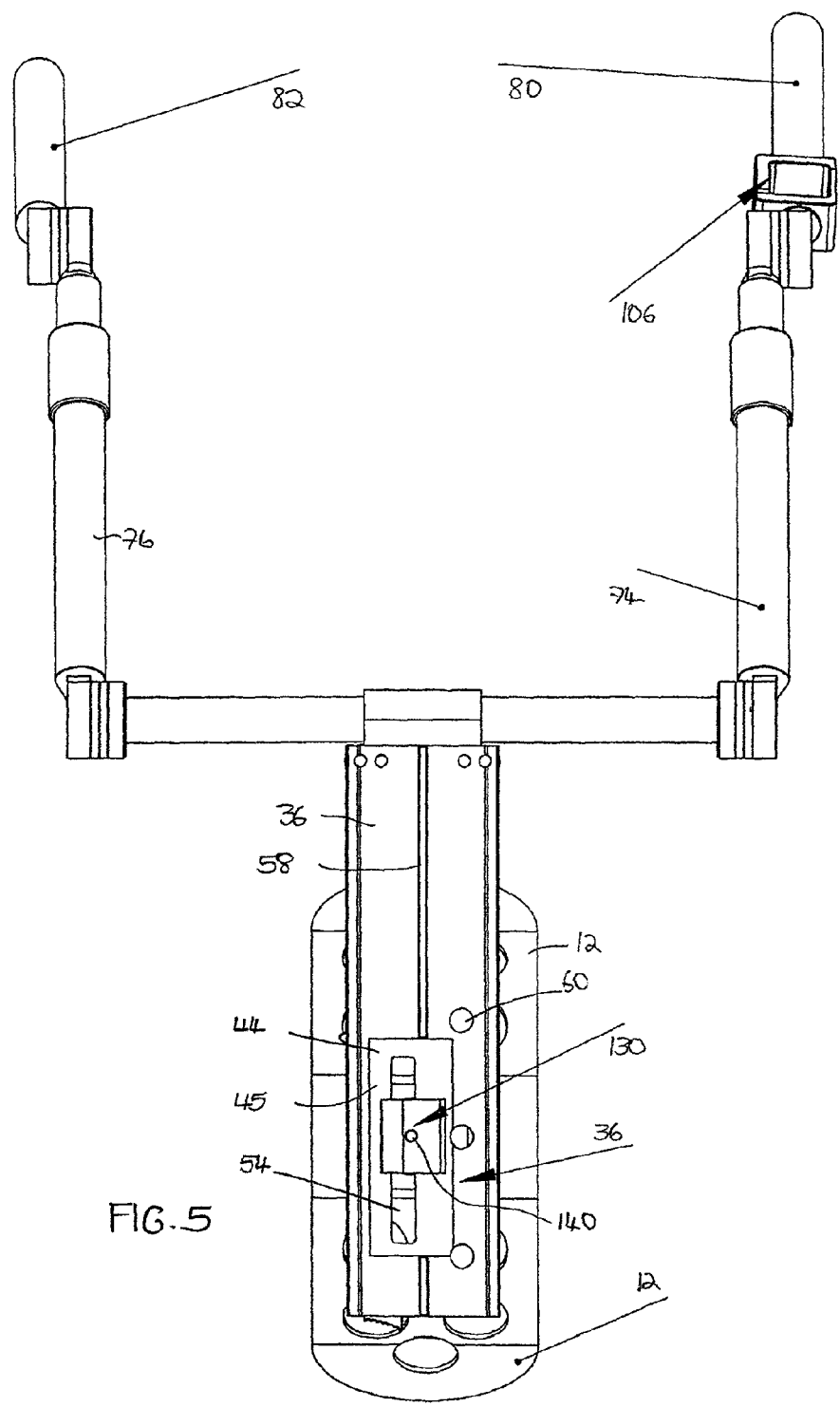
FIG. 5 is a top view of the hand held camera unit of the invention shown in FIG. 1 of the drawings.

With reference to FIG. 5 of the drawings, there is shown a top view of the hand-held camera unit 10 of the invention, providing a clear top view, particularly of the dovetail assembly 36, including the track 58, the curved recess 44, the concave surface 45 and the slot 54. One of the components of the connector mechanism 102 is a convex nut 130, which engages the concave surface 45 of the curved recess 44, as will be described in further detail below.

Figure 6:
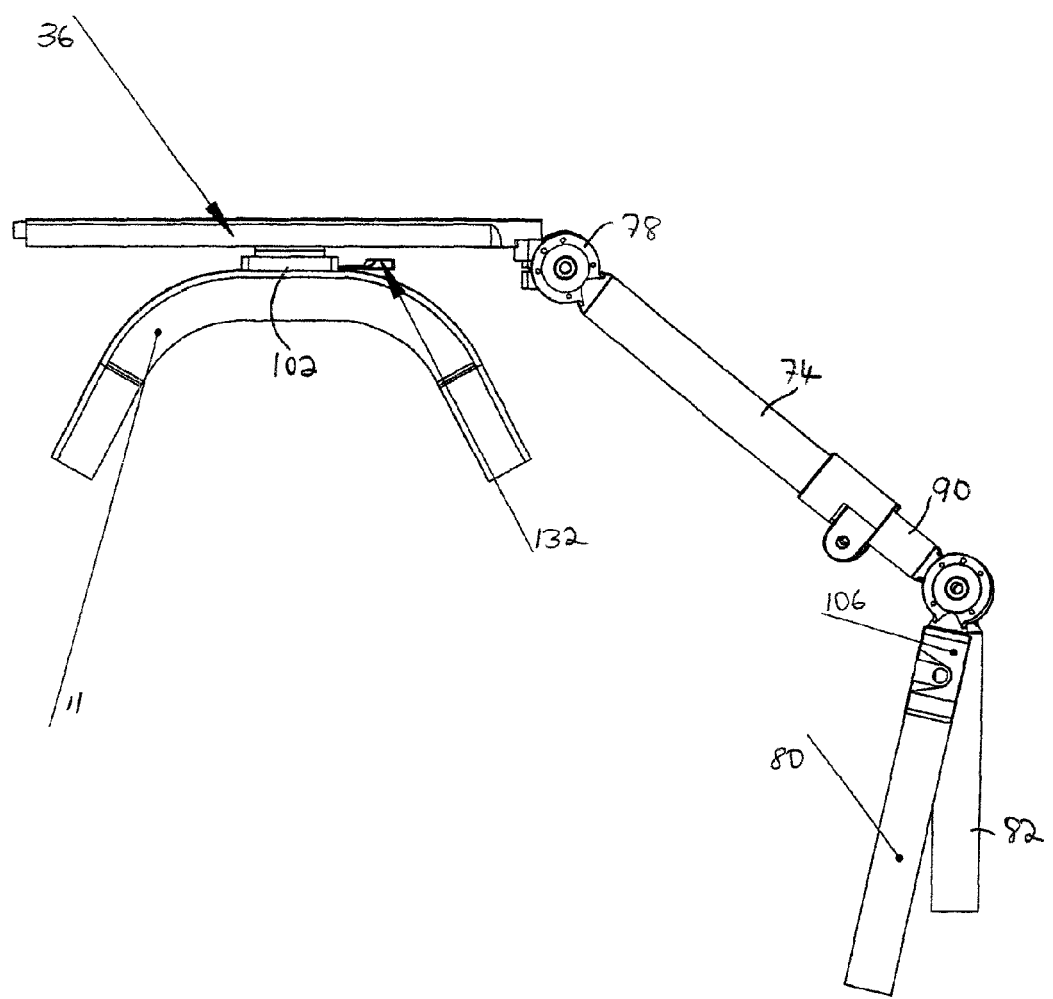
FIG. 6 is a right side view of the hand held camera unit of the invention shown in FIG. 1 of the drawings.

In FIG. 6 of the drawings, there is shown a side view of the hand-held camera mount of the invention, including the dovetail assembly 36, the shoulder assembly 11, and the connector mechanism 102 there between. The connector mechanism includes a locking lever 132, as will be described in further detail below, which secures and loosens the dovetail assembly 36 relative to the shoulder assembly 11, and when unlocked allows the dovetail assembly 36 to be moved in three different orientations and then locked to retain the orientation or configuration which meets the current requirements of the operator.

With reference to FIG. 7 of the drawings, this illustrates a hand-held camera unit 10 much as the one shown in FIG. 6 of the drawings. However, in the unit 10 shown in FIG. 7, the lateral handles 74 and 76 are shown in the telescoped position, providing, in this particular embodiment, an additional inches to the length of the lateral handles 74 and 76. A telescope control mechanism 138 is shown in FIG. 7 and appropriate use of the telescope control mechanism 138 will secure the handle telescope 90 in a desired position. Thus, the handle telescope 90 can be fully extended from the lateral handle 74 or 76, or partially extended to a distance convenient for the operator, or wholly withdrawn and contained within the lateral handle 74. The telescope control mechanism 138 will include bolts, toggles or other mechanisms for releasably securing the handle telescope 90 at any desired point relative to the lateral handles 74 and 76.

Figure 8:
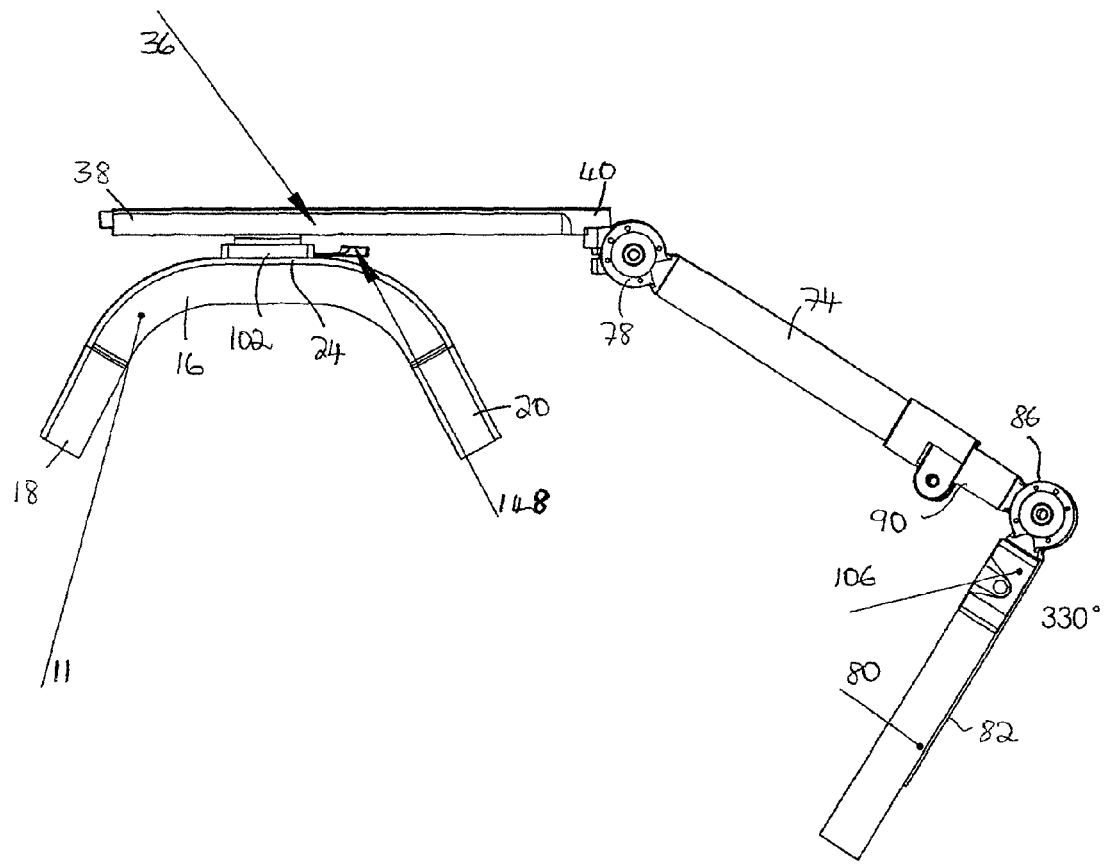
FIG. 8 is a right side view of the hand held camera unit of the invention shown in FIG. 1 of the drawings, with the handle grips shown in an alternative or varied position.

With reference to FIG. 8 of thee drawings, there is shown another side view of the hand-held camera unit 10 in accordance with the invention, this time illustrating the rotation potential of the handle grip 80. FIG. 4 of the drawings illustrated the potential rotation of the handle grips 80 in one plane, while the rotation illustrated in FIG. 8 of the drawings is in another. Thus, the handle grip 80 can be rotated from a position in which it is substantially against the lower part of the lateral handle 74, through approximately 330° to where it will abut or be near the upper part of the lateral handle 74. With the handle grip 80 being rotatable in two orientations, it will be appreciated that the position of the handle grip 80 is highly adjustable, and can be placed in just about any position convenient for the operator.

Figure 9:
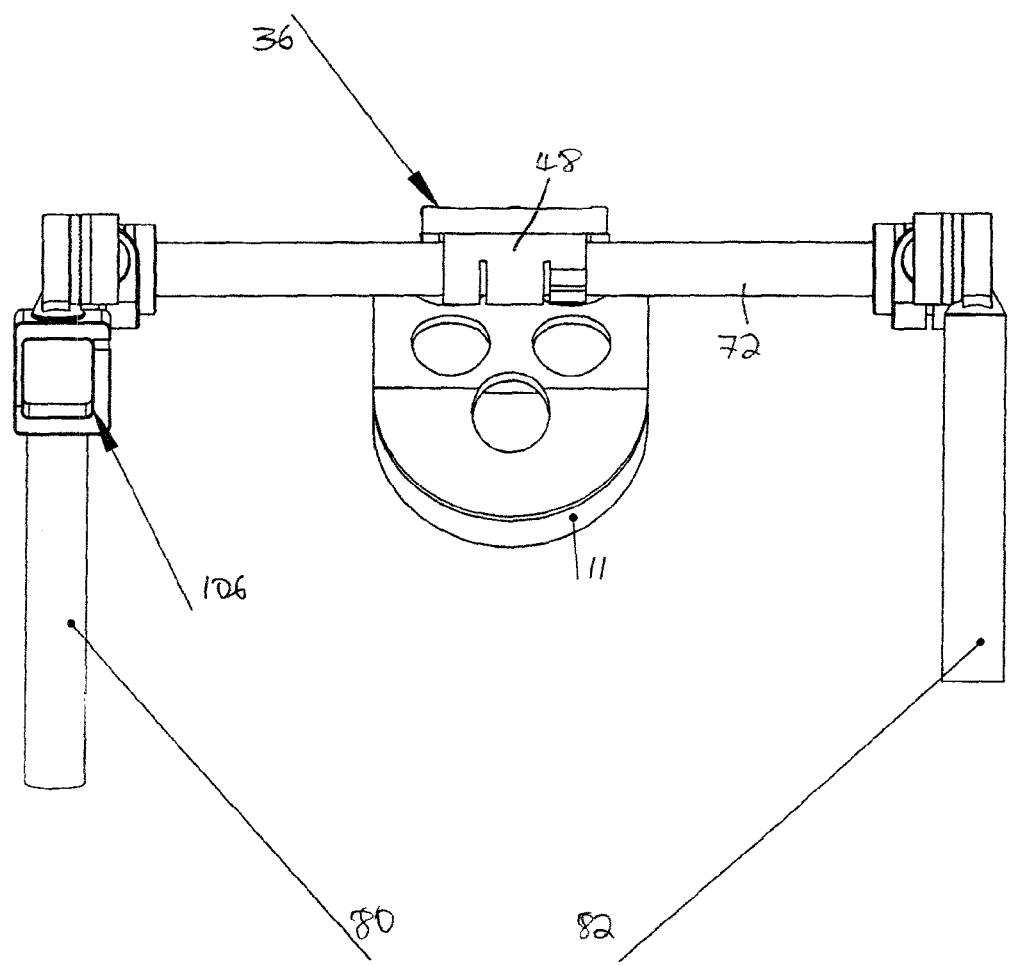
FIG. 9 is a front view of the hand held camera unit of the invention shown in FIG. 1 of the drawings, with the handles shown in an alternative or varied position.

In FIG. 9 of the drawings, there is shown a front view of the hand-held camera unit of the invention intended to illustrate the axis rotatability of the grip handles 80 and 82. Thus, not only can the grip handle be rotated in two orientations with respect to the lateral handle 74, but each grip handle 80, 82 can further be rotated about its own axis so that it will not be necessary for the operator to release the handle grip 80 as its position varies, and grip the handle grips 80 again when in the desired position. The handle grips 80, 82 make this unnecessary by virtue of their capacity to rotates about their own axes so that a consistent grip can be maintained thereon without releasing or partially releasing the handle grips 80, 82 as the hand-held camera unit 10 is moved, and requires a slightly altered engagement.

Figure 10:
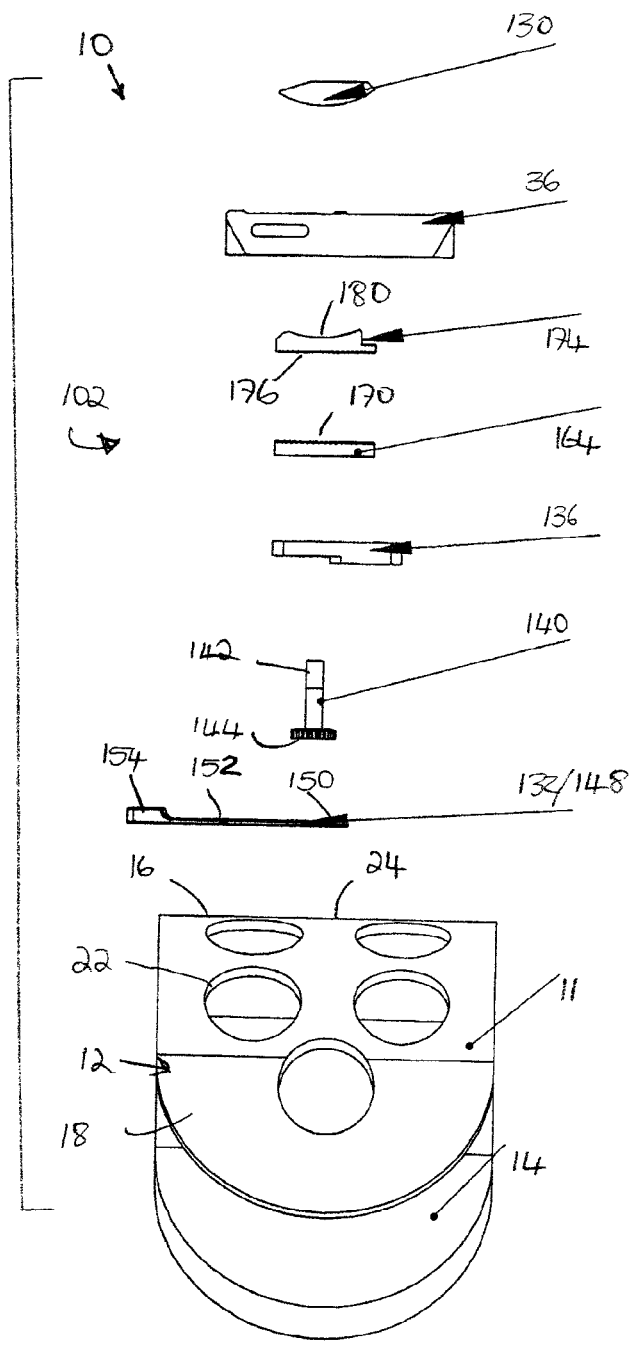
FIG. 10 is a front exploded view of the hand held camera unit of the invention shown in FIG. 1 of the drawings, but without the handles and hand grips illustrated.

FIG. 10 of the drawings shows an exploded view of the various components of the hand-held camera unit 10 of the invention. The unit 10, as shown in FIG. 10 comprises a shoulder assembly 11 comprising the shoulder frame 12 and the shoulder pad 14. The side portion 18 can be seen, as can the holes 22. The shoulder frame 12 includes the center portion 16, with connecting plate 24, on which the connector mechanism 102 is mounted, as will be described.

The connector mechanism 102 comprises a pan base 136 which is secured to the connecting plate 24 on the center portion 16. The pan base 136 may be secured thereto by or through the connector holes 26. A spline head screw 140 is held in position by the pan base 136 and extends upwardly from the connecting plate 24. The spline head screw 140 comprises a shaft 142 and spline head 144. The spline head 144 is held by the pan base 136 and secured between the pan base 136 and the connecting plate 124. A locking lever 148 is also held between the pan base 136 and the connecting plate 124. The locking lever 148 comprises a splined aperture 150 (see FIG. 12 of thee drawings), an arm 152 and a lever head 154. The spline head 144 of the spline head screw 140 is received within the splined aperture 150, and rotation of the locking lever 148 by manipulation of the lever head 154 causes the spline head screw 140 to rotate. Depending on the direction of rotation, this will cause the dovetail assembly 36 to be loosened from or tightened to the shoulder assembly 11, as will be described, so that the dovetail assembly 36 can be placed in any one of a number of orientations, angles and positions, to suit the operator.

The pan base 136 has on its upper surface 160 a circular recess 162 in which is received a pan base rosette 164. Both the pan base 136 and pan base rosette 164 have central apertures 166 and 168 through which the shaft 142 of the spline head screw 140 passes. The upper surface of the pan base rosette 164 has a ridged surface 170.

The connector mechanism 102 further comprises a concave rosette 174. The concave rosette 174 has a ridged lower surface 176 which abuts, and engages with, the ridge surface 170 of the pan base rosette 164 when the two are secured firmly to each other. Thus, rotation of the one will automatically rotate the other.

The upper surface of the concave rosette 174 has a concave surface 180. Further, the concave rosette 174 has a central aperture 182 through which the shaft 142 of the spline head screw 140 passes.

The locking lever 148, spline head screw 140, pan base 136, pan base rosette 164, and concave rosette 174 are all positioned below the dovetail assembly 36, or, in other words, between the dovetail assembly 36 and the shoulder assembly 11. Further, it should be noted that the concave surface 180 of the concave rosette 174 has a corresponding shape and dimension to the concave surface 45 of the curved recess 44 of the dovetail assembly 36. Thus, the concave surface 180 engages the lower part or underside of the concave surface 45 of the curved recess 44.

The final component of the connector mechanism 102 comprises the radial convex nut 130. The radial convex nut 130 has a central aperture 190 which receives the shaft 142 of the spline head screw 140. The spline head screw 140 is secured to the radial convex nut 130 either by threadingly engaging within the aperture 190, or by the presence of another fastening nut above the radial convex nut 130.

The radial convex nut 130 has a convex lower surface 192 and a generally flat upper surface 194. The convex lower surface 192 is of generally the same shape and configuration as the concave surface 45 on the curved recess 44, and engages therewith.

The shaft 142 of the spline head screw extends upwardly from the connecting plate 24, through the various components, and extends through the slot 54. The radial convex nut 130 is received in the curved recess 44, and depending on how tightly secured the concave rosette 174 and the radial convex nut 130 are secured with respect to each other, the walls of the curved recess 44 will be either firmly sandwiched and secured therebetween, or slightly looser, so as to permit movement and adjustment, as will be described.

The locking lever 148 is movable, as will be seen in some of the further illustrations, between a "locked position", wherein the spline head screw 140 is turned so as to be tightened or reduce the distance between the radial convex nut 130 and the concave rosette 174, and an "unlocked position" wherein the spline head screw 140 is turned so as to be loosened or increase the distance between the radial convex nut 130 and the concave rosette 174. In so doing, the radial convex nut 130 and concave rosette 174, with matching surfaces, and the concave surface 45 therebetween, grips or sandwiches the concave surface 45, thereby preventing further movement between the dovetail assembly 36 and the shoulder assembly 11.

The locking lever 148 may be moved to the "unlocked position", which turns the spline head screw 140 just enough to loosen the grip of the concave surface 45 between the concave rosette 174 and the radial convex nut 130. This will allow the dovetail assembly 36 to be moved in several different orientations, as discussed below.

Figure 11:
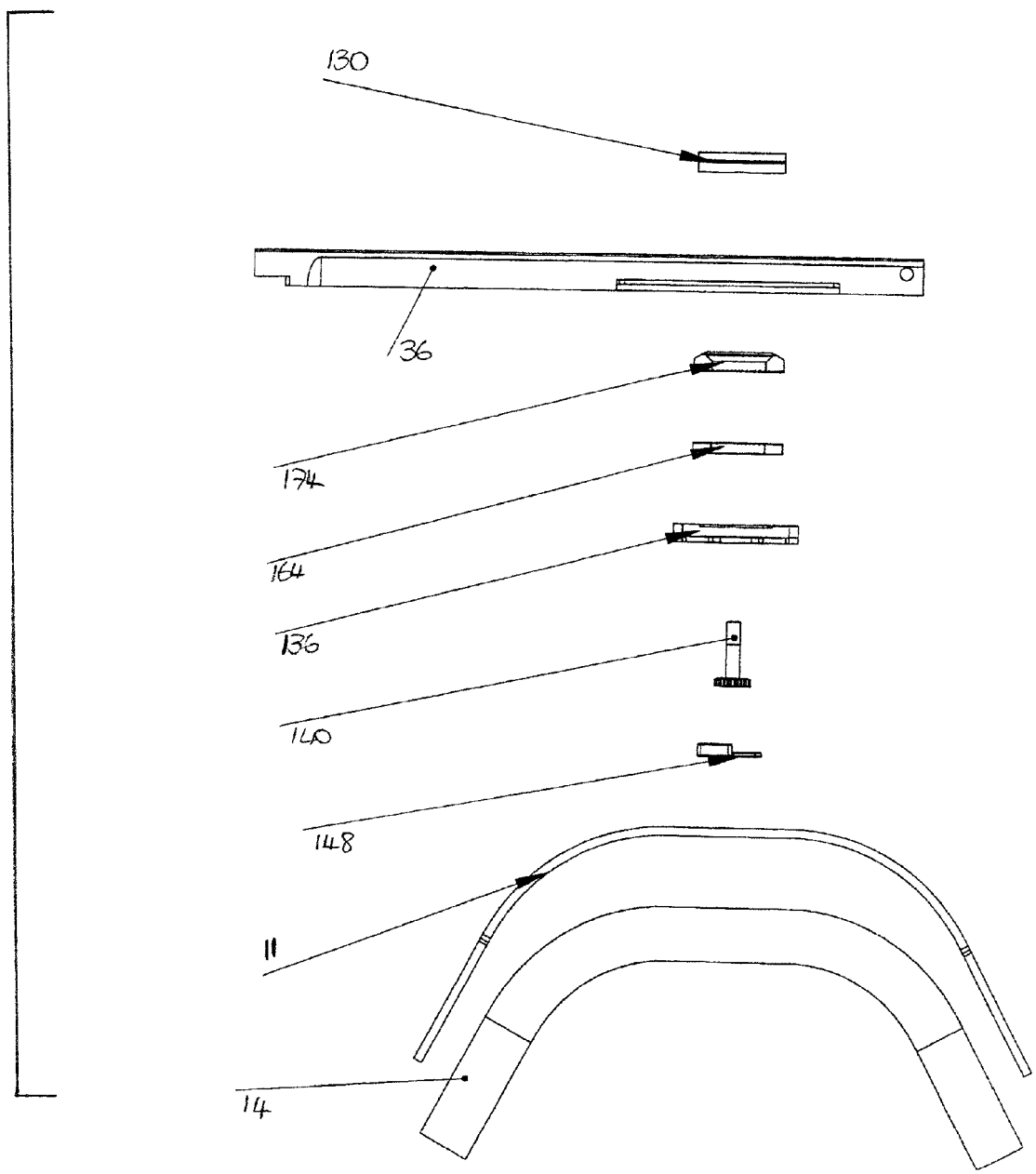
FIG. 11 is a left side exploded view of the hand held camera unit of the invention shown in FIG. 10 of the drawings.

In FIG. 11 of the drawings, an exploded view of the hand-held camera unit 10 of the invention is shown, similar to that in FIG. 10 but constituting a lateral view. FIG. 11 of the drawings shows a perspective exploded view of the hand-held camera unit of the invention, clearly showing all the different components, and the matching or registering surfaces, so that the operation and flexibility of the unit 10 can be well appreciated.

Figure 12:
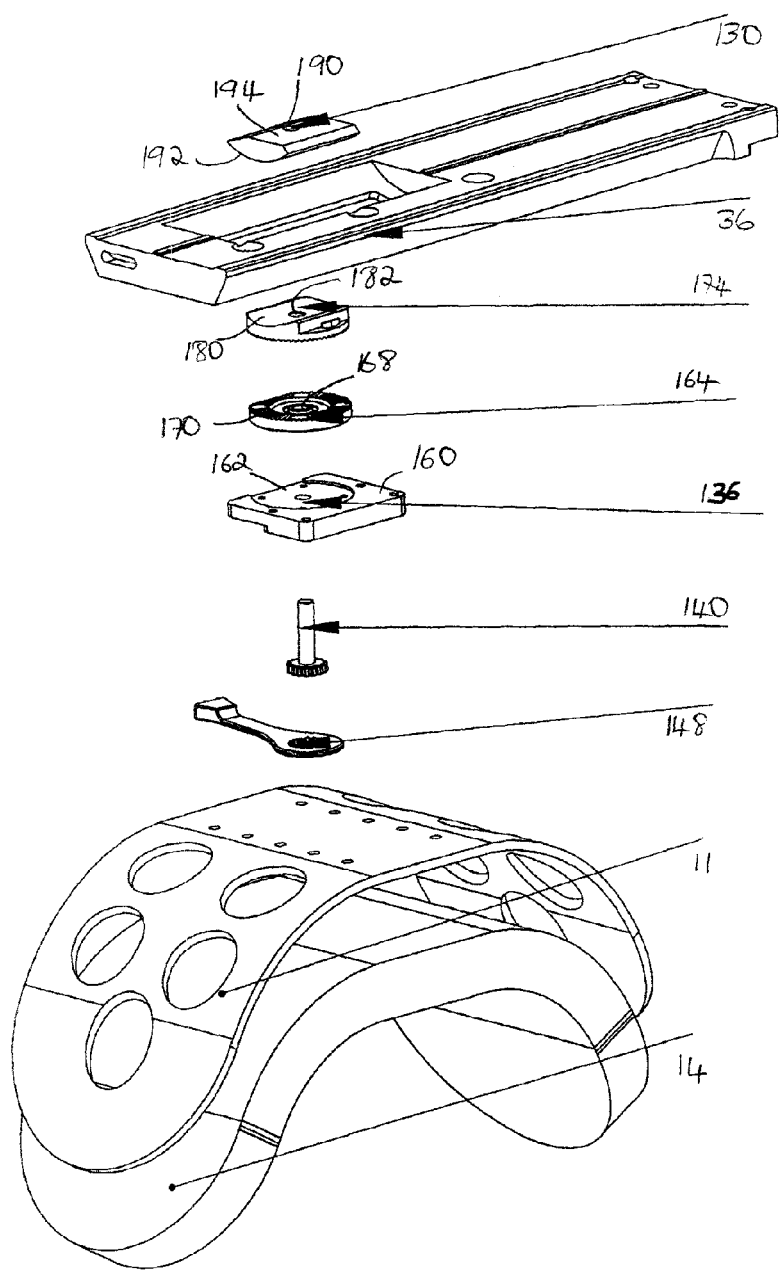
FIG. 12 is a front perspective exploded view of the hand held camera unit of the invention shown in FIG. 10 of the drawings.
Figure 13:
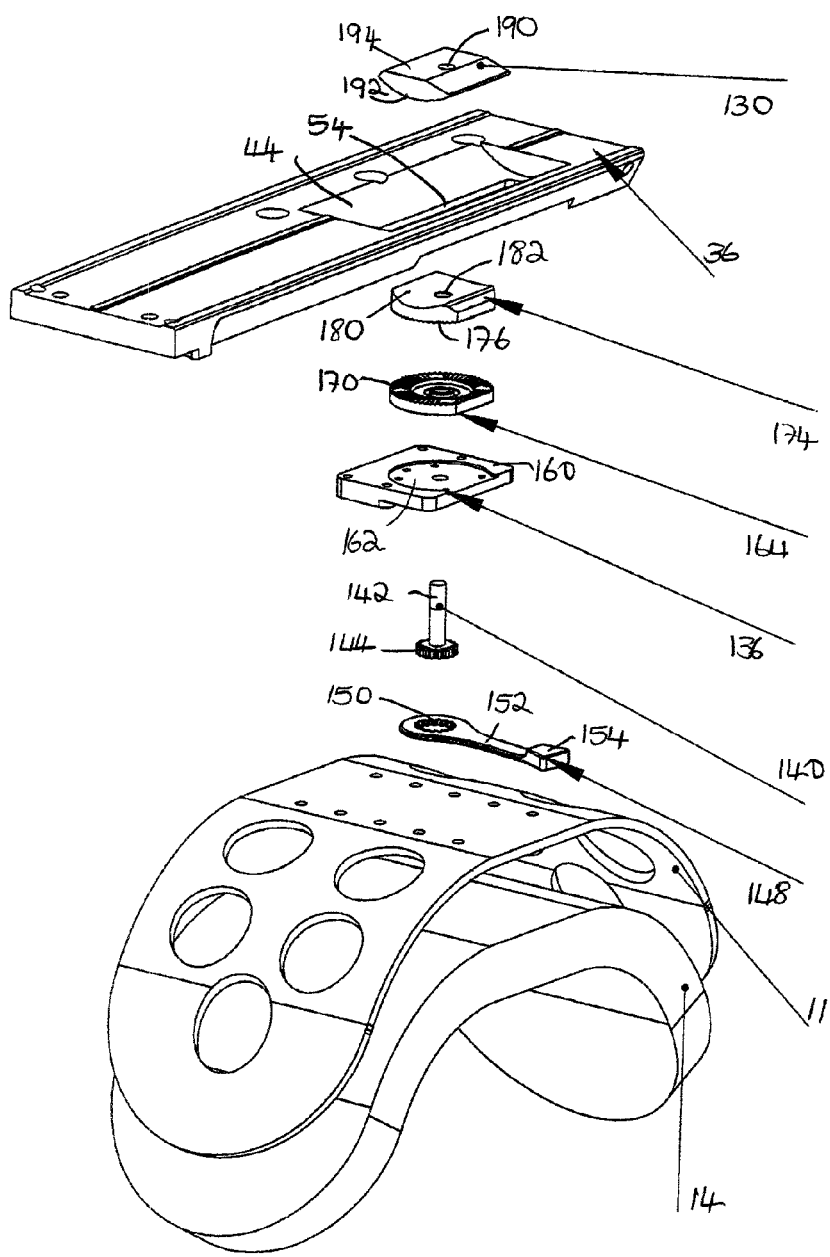
FIG. 13 is a rear perspective exploded view of the hand held camera unit of the invention shown in FIG. 10 of the drawings.

FIG. 13 of the drawings is a view similar to that in FIG. 12, with FIG. 12 being a rear perspective view, and FIG. 13 being a front perspective view of the same components in an exploded fashion to clearly highlight the structure and operation of the unit 10.

The structure and configuration of the hand-held camera unit, as clearly illustrated and described with respect to the previous drawings, allows the dovetail assembly 36 to move relative to the shoulder assembly 11 in various ways. First, fore and aft adjustment of the dovetail assembly 36 can be achieved along the optical axis of the camera. Second, a roll axis adjustment of the dovetail assembly 36 can be achieved to vary the horizontal orientation of the dovetail assembly 36 relative to the shoulder assembly 11. Third, a yaw axis adjustment can be achieved wherein the dovetail assembly 36 can be swivelled or pivoted relative to the shoulder assembly 11. These different adjustments, in addition to simultaneous combinations of adjustments, are described below with reference to the drawings.

Figure 14:
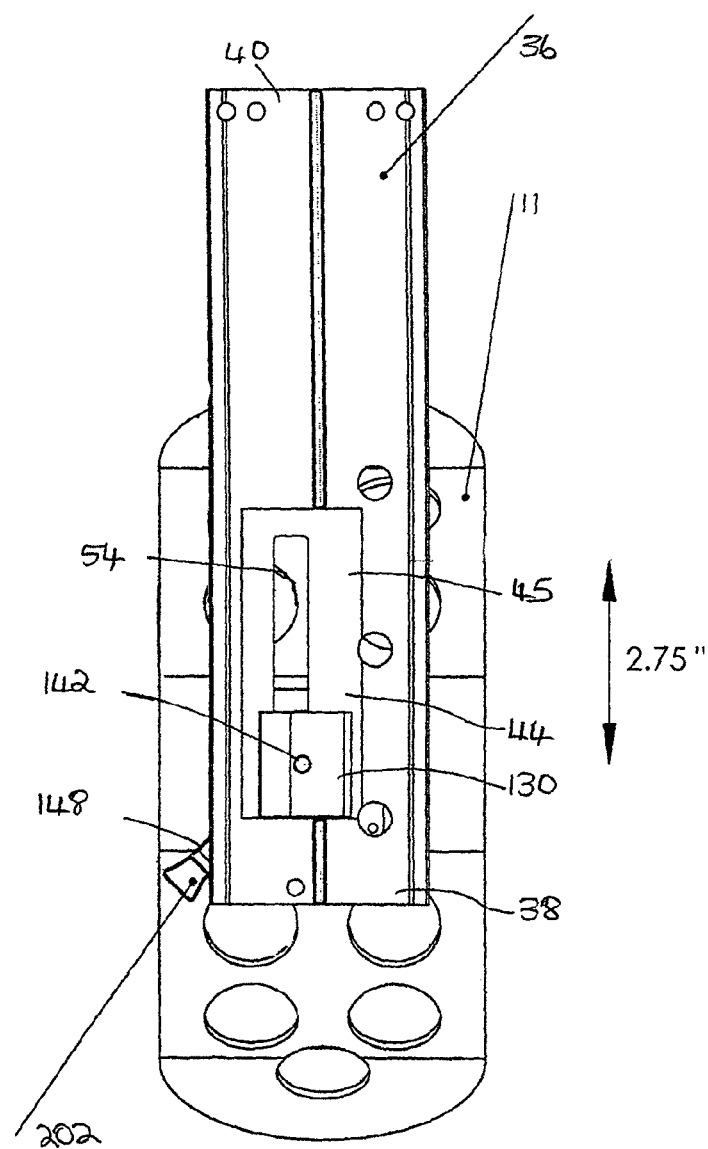
FIG. 14 is a top view of the hand held camera unit of the invention shown without handles and hand grips, illustrating the fore and aft adjustment along the optical axis of the camera and in the locked position.
Figure 15:
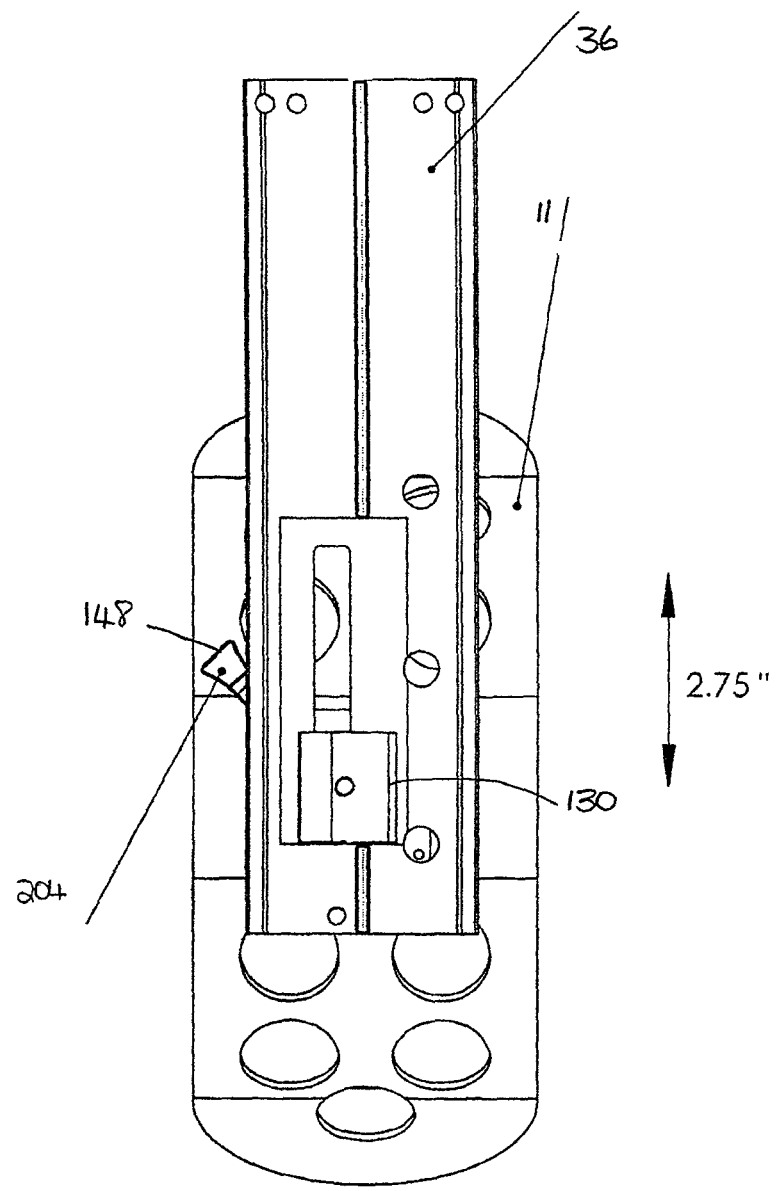
FIG. 15 is a view similar to that shown in FIG. 14 of the drawings but with the lever in the unlocked position.
Figure 16:
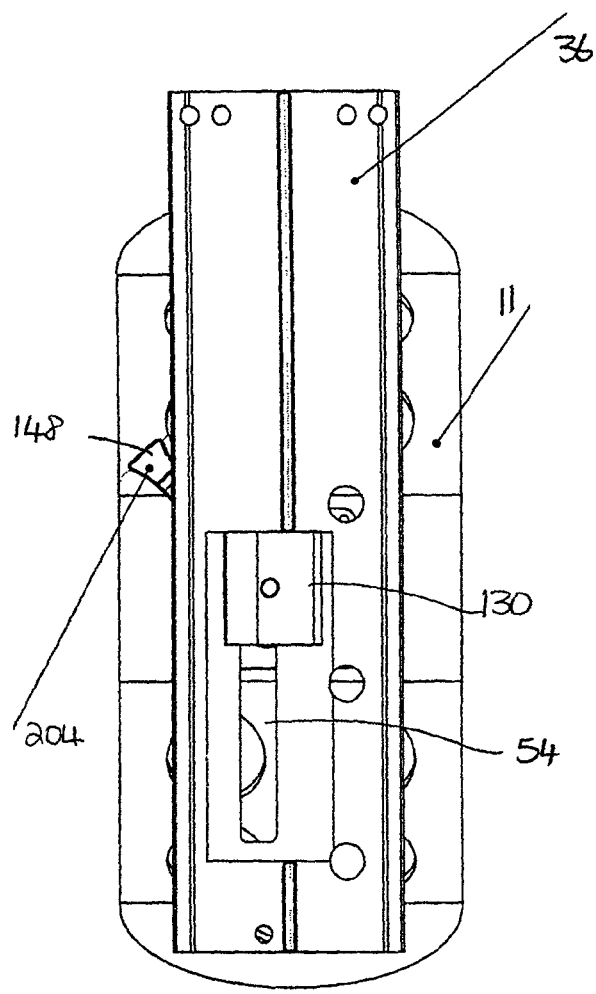
FIG. 16 is a top view of the hand held camera unit shown in FIG. 15 of the drawings, with the dovetail assembly moved to the rear and the lever in the unlocked position.
Figure 17:
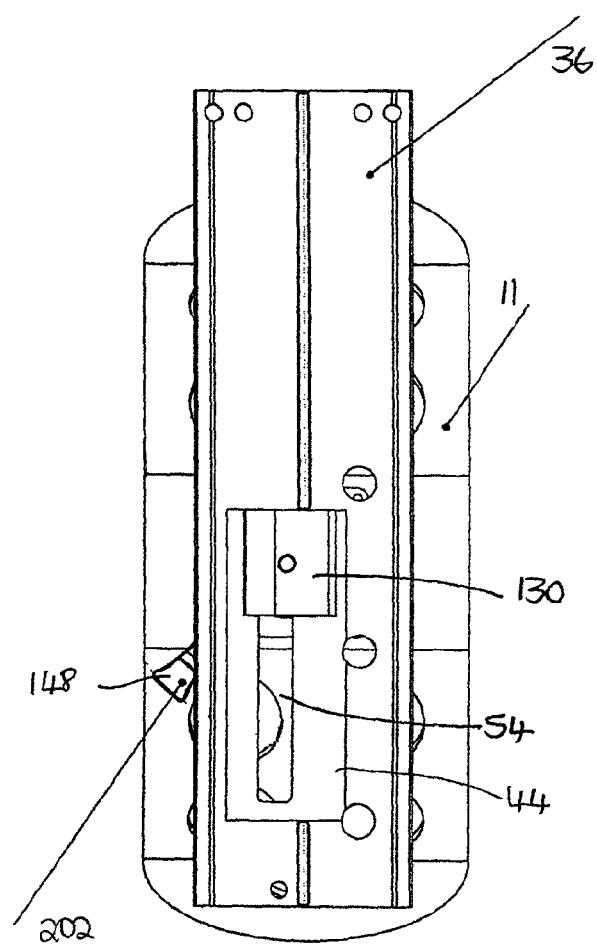
FIG. 17 is a view similar to that shown in FIG. 16 of the drawings but with the lever in locked position.

FIGS. 14 to 17 of the drawings illustrate the for and aft adjustment of the dovetail assembly 36 relative to the shoulder assembly 11. In FIG. 14 of the drawings, the dovetail assembly is shown in a forward or extended position relative to the shoulder assembly 11, and the locking lever 148 is in a locked position 202. FIG. 14 also shows the radial convex nut 130 in the curved recess 44, the convex nut 130 being secured by the shaft 142 of the spline head screw 140. When the locking lever 148 is in the locked position 202 as shown in FIG. 14, the wall comprising the curved recess 44 is sandwiched or gripped between the convex surface 192 of the radial convex nut and the concave surface 180 of the concave rosette 174. In order to adjust the position of the dovetail in a fore or aft direction along the optical axis of the camera, the locking lever 148 is moved to the unlocked position 204, as shown in FIG. 15 of the drawings. The unlocked position 204 results in a relaxation of the gripping force between the radial convex nut 130 and the concave rosette 174, allowing the dovetail assembly 36 to move rearwardly to the rearmost position shown in FIG. 16 of the drawings. As the dovetail assembly 36 moves rearwardly, the spline head screw 140 moves in the slot 154. When the dovetail assembly 36 is in the desired position, such as the rearmost position shown in FIG. 16, the locking lever 148 is moved from the unlocked position, as shown in FIG. 16, to the locked position as shown in FIG. 17 of the drawings, causing the radial convex nut 130 and concave rosette 174 to grip the walls of the curve recess 44 and secure the dovetail assembly 36 firmly in position relative to the shoulder assembly 11.

Of course, the dovetail assembly 36 need not be at either the extreme forward or rear positions, but can be located at any convenient location there between.

Figure 18:
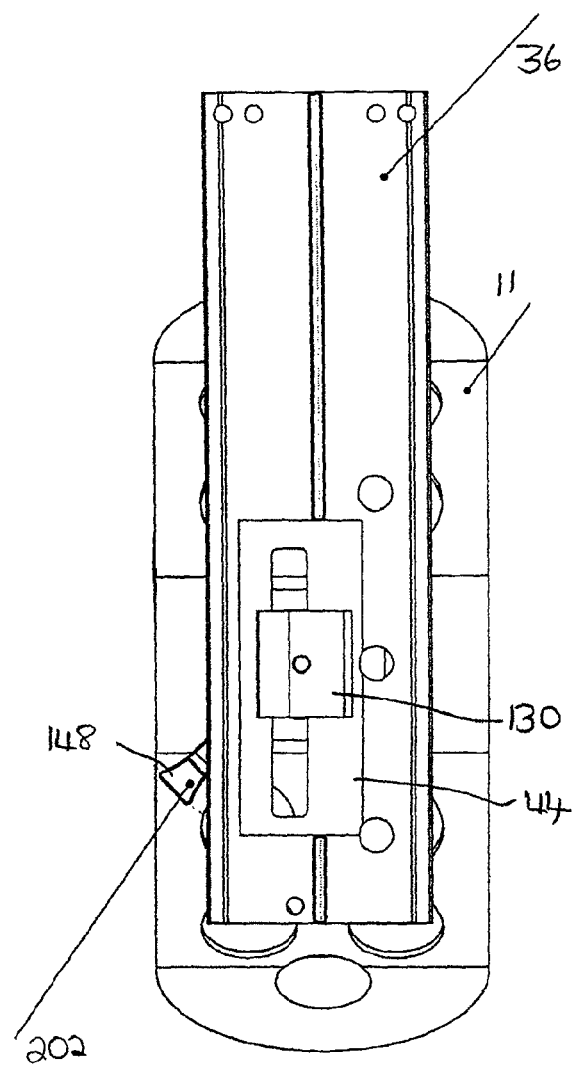
FIG. 18 is a top view of the hand held camera unit of the invention shown without handles and hand grips, illustrating the roll axis adjustment of the camera and with the lever in the locked position.
Figure 22:
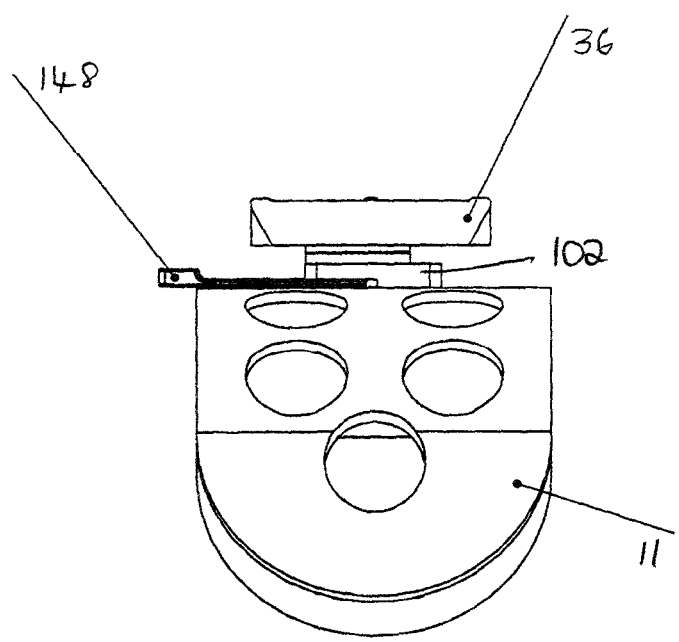
FIG. 22 is a side view of the hand held camera unit of the invention shown in FIG. 18, illustrating the roll axis adjustment wherein the dovetail assembly is substantially parallel with the shoulder assembly.

In FIGS. 18 to 23 of the drawings, the roll axis adjustment of the dovetail assembly 36 relative to the shoulder assembly 11 is illustrated. In FIG. 18 of the drawings, the dovetail assembly is generally parallel with respect to the shoulder assembly 11, and a front view of this particular configuration is also shown in FIG. 22 of the drawings.

Figure 19:
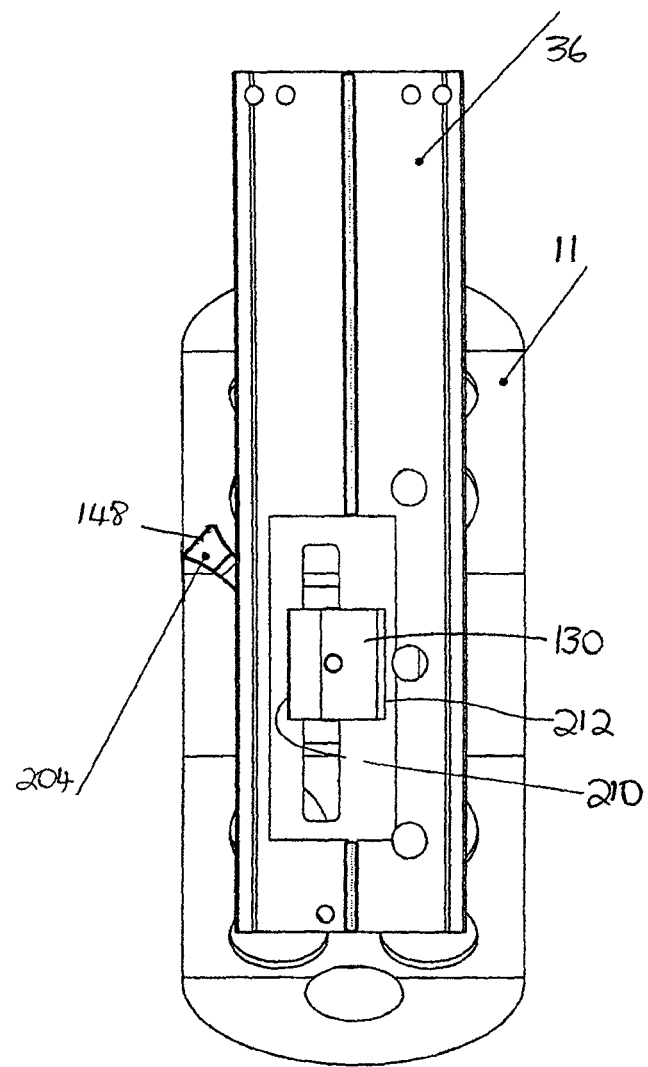
FIG. 19 is a view similar to that shown in FIG. 18 of the drawings but with the lever in the unlocked position.
Figure 20:
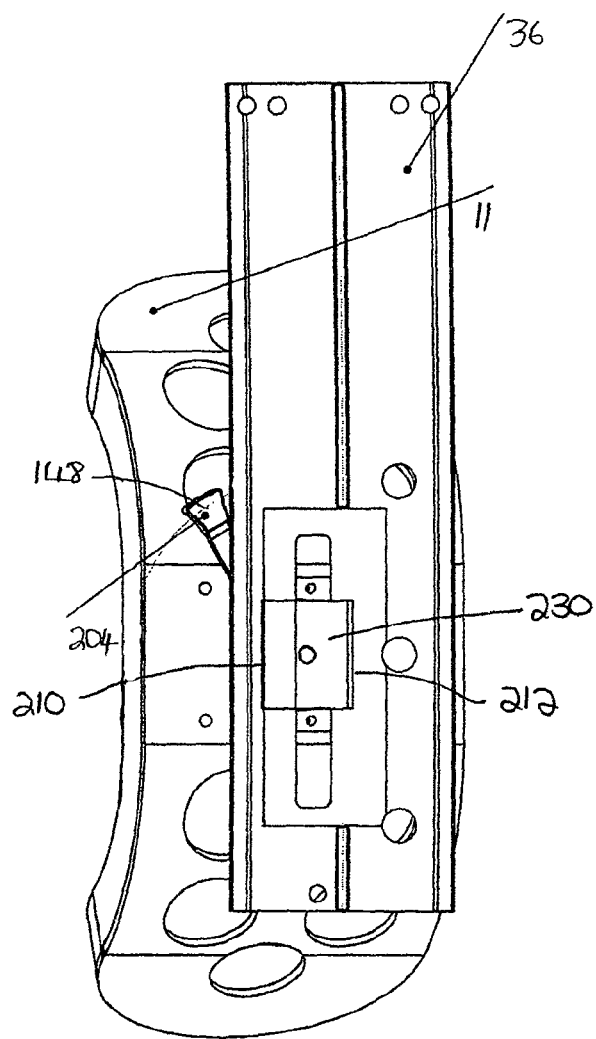
FIG. 20 is a top view of the hand held camera unit shown in FIG. 18 of the drawings, with the dovetail assembly moved on the roll axis and the lever in the unlocked position.
Figure 21:
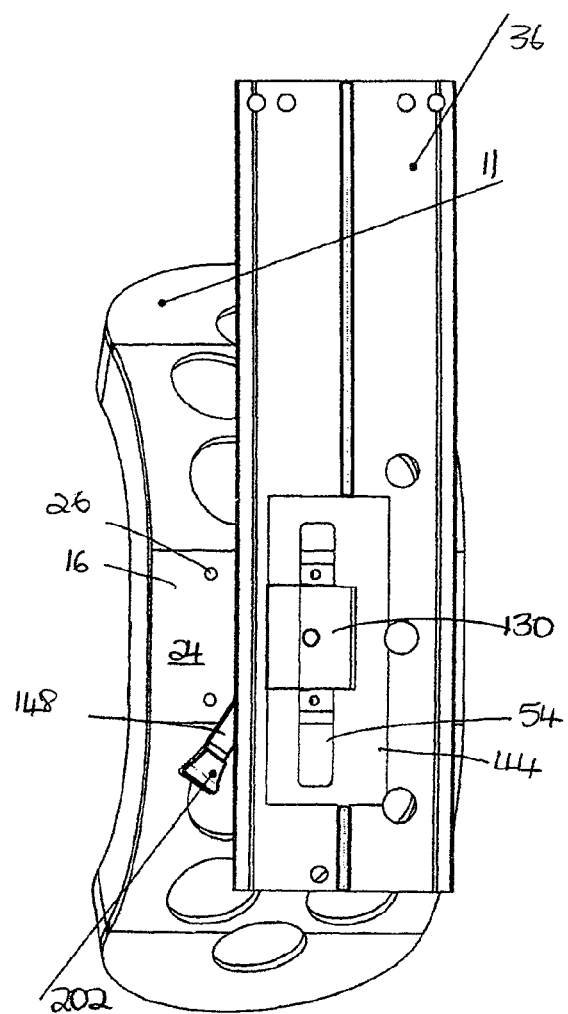
FIG. 21 is a view similar to that shown in FIG. 20 of the drawings but with the lever in the locked position.
Figure 23:
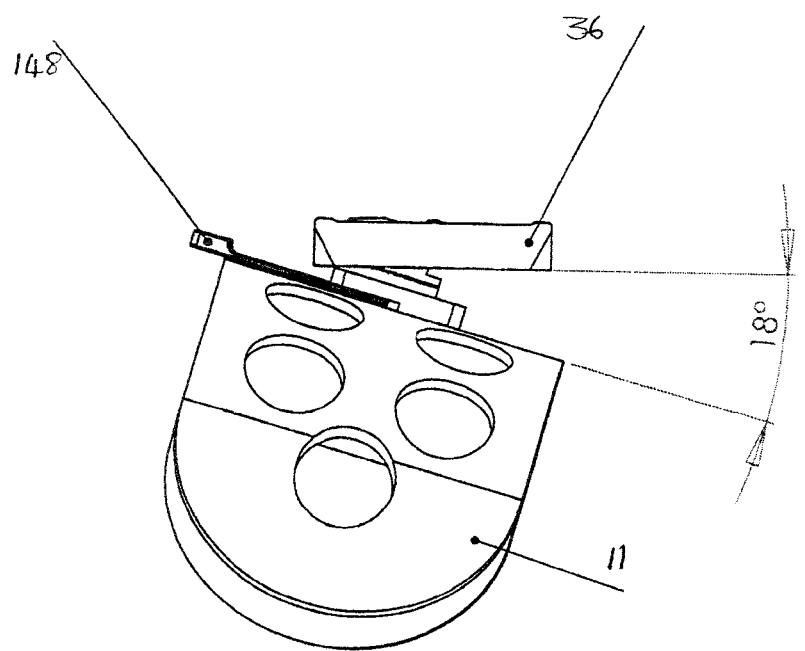
FIG. 23 is a side view of the hand held camera unit of the invention shown in FIG. 18, illustrating the roll axis adjustment wherein the dovetail assembly is at an angle to the shoulder assembly.

In order to adjust the roll axis, the lever 148 is moved from the locked position 202 to the unlocked position 204, as seen in FIG. 19 of the drawings, releasing some of the tension exerted on the wall of the curved recess 44, between the radial convex nut 130 and the concave rosette 174. In the unlocked position, the dovetail assembly 36 can be slightly axially rotated, one example of which is shown in FIG. 20 of the drawings. Prior to any adjustment, it will be seen that the lateral edges 210 and 212 of the radial convex nut 130 are approximately equidistant from the ends of the curved recess 44. In FIG. 20, the lateral edge 210 is up against the edge of the curved recess 44 by virtue of the dovetail assembly 36 having been axially rotated a small distance. Due to the curved nature of the concave surface 180, convex surface 192, and concave surface 45 of the curved recess 44, movement of the dovetail assembly 36 about its axis will tilt the dovetail assembly 36 relative to the shoulder assembly 11. When tilted to the maximum, which may be 18°, or anything up to 18°, multiple options are available for the operator. FIG. 23 of the drawings shows where the dovetail assembly 36 is tilted at approximately 18° relative to the shoulder assembly 11, a top view of which is shown and illustrated in FIGS. 20 and 21 of the drawings. When the dovetail assembly 36 has been appropriately rotated to achieve the desired orientation, the lever 148 is moved from the unlocked position 204 shown in FIG. 20, to the locked position 202 shown in FIG. 21. When the lever is in the locked position 202, the dovetail assembly 36 will be firmly held in position at the desired orientation.

Figure 24:
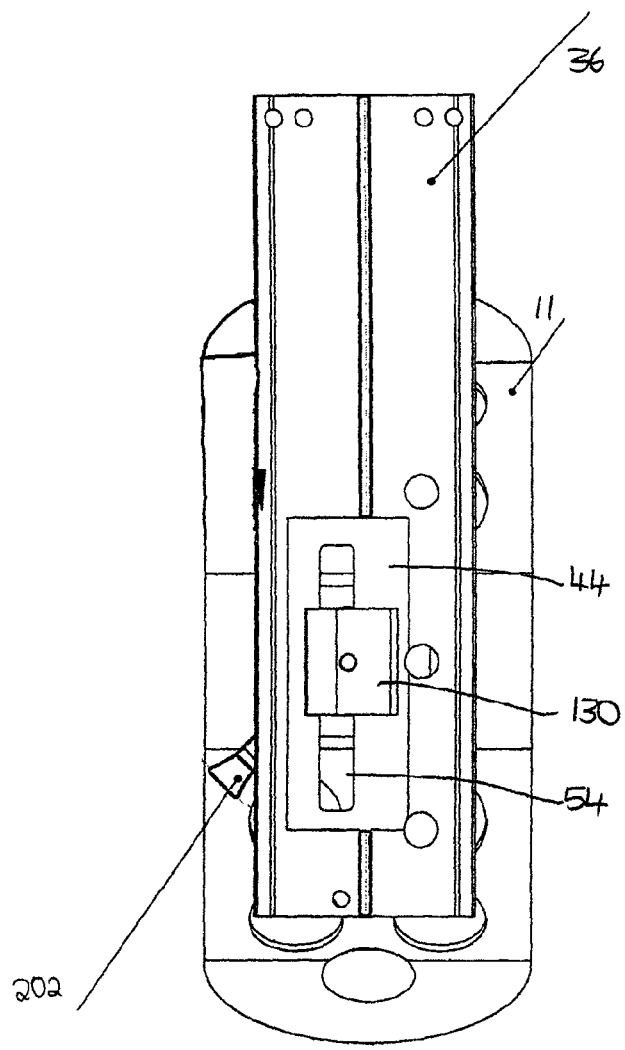
FIG. 24 is a top view of the hand held camera unit of the invention shown without handles and hand grips, illustrating the yaw axis adjustment of the camera and with the lever in the locked position.
Figure 25:
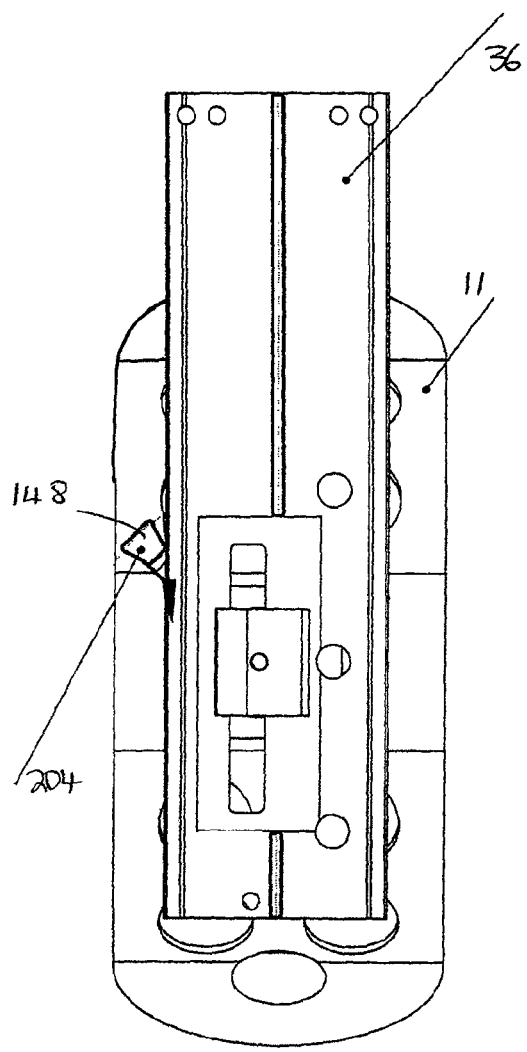
FIG. 25 is a view similar to that shown in FIG. 24 of the drawings but with the lever in the unlocked position.
Figure 26:
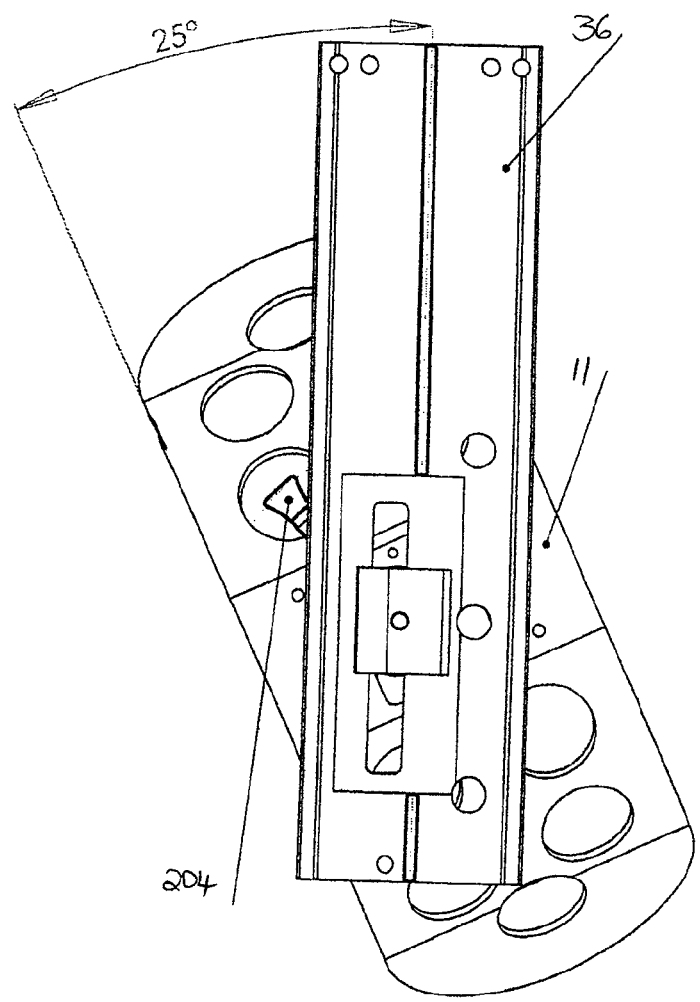
FIG. 26 is a top view of the hand held camera unit shown in FIG. 24 of the drawings, with the dovetail assembly moved on the yaw axis and the lever in the unlocked position.
Figure 27:
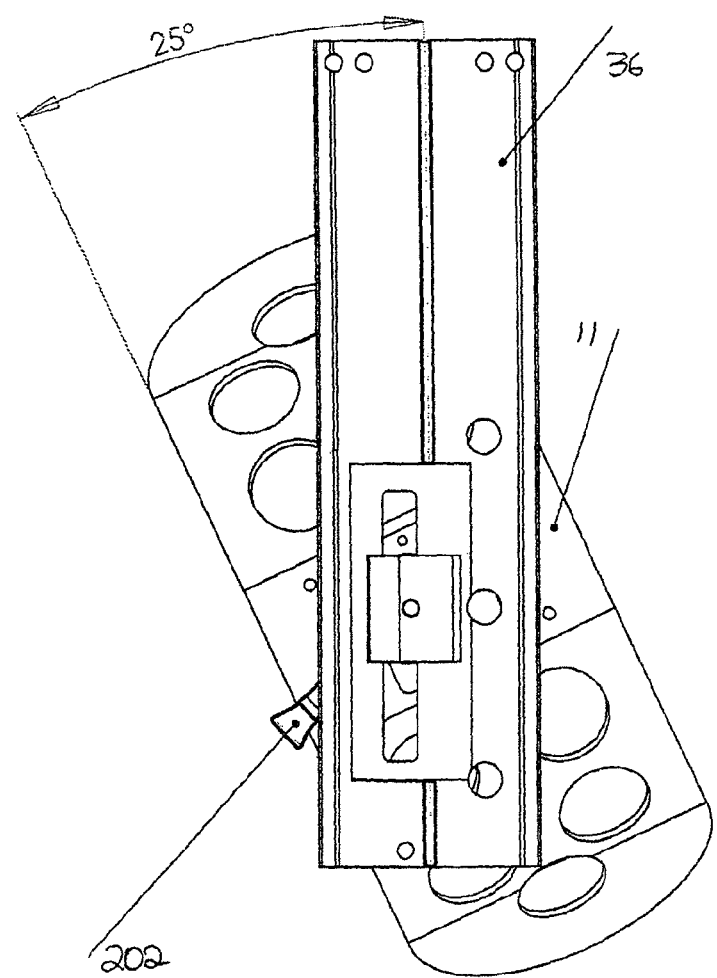
FIG. 27 is a view similar to that shown in FIG. 26 of the drawings but with the lever in the locked position.

FIGS. 24 to 27 of the drawings show how the hand-held camera unit 10 of the invention maybe adjusted in the yaw axis. FIG. 24 of the drawings shows the dovetail assembly 36 in a generally parallel plane relative to the shoulder assembly 11. The lever is in the locked position 202. To initiate adjustment in the yaw axis, the lever is moved to the unlocked position 204, as shown in FIG. 25 of the drawings. This will allow the dovetail assembly 36 to be pivoted or rotated about the axis of the shaft 142 of the spline head screw 140, through a certain amount, such as 25°, as illustrated in FIG. 26 of the drawings. When the desired orientation has been achieved, the locking lever is moved from the unlocked position 204 to the locked position 202 as shown in FIG. 27 of the drawings, and the dovetail assembly 36 will be fixed in the desired yaw axis with the locking lever 148 so locked.

From the above, it will be appreciated that the dovetail assembly 36 is highly maneuverable and flexible relative to the shoulder assembly 11, and that by loosening the locking lever 148 from the locked position 202 to the unlocked position 204, the operator has the ability to move the dovetail assembly 36, upon which the camera unit 10 is mounted, fore or aft, roll the dovetail assembly 36, or pivot it in the yaw axis. In fact, these are not three separate movements, but can be achieved in a single movement whereby the operator moves the dovetail assembly 36 from a first position to a second desired position, which may utilize the flexibility of the camera unit 10 to move in all three orientations.

Figure 28:
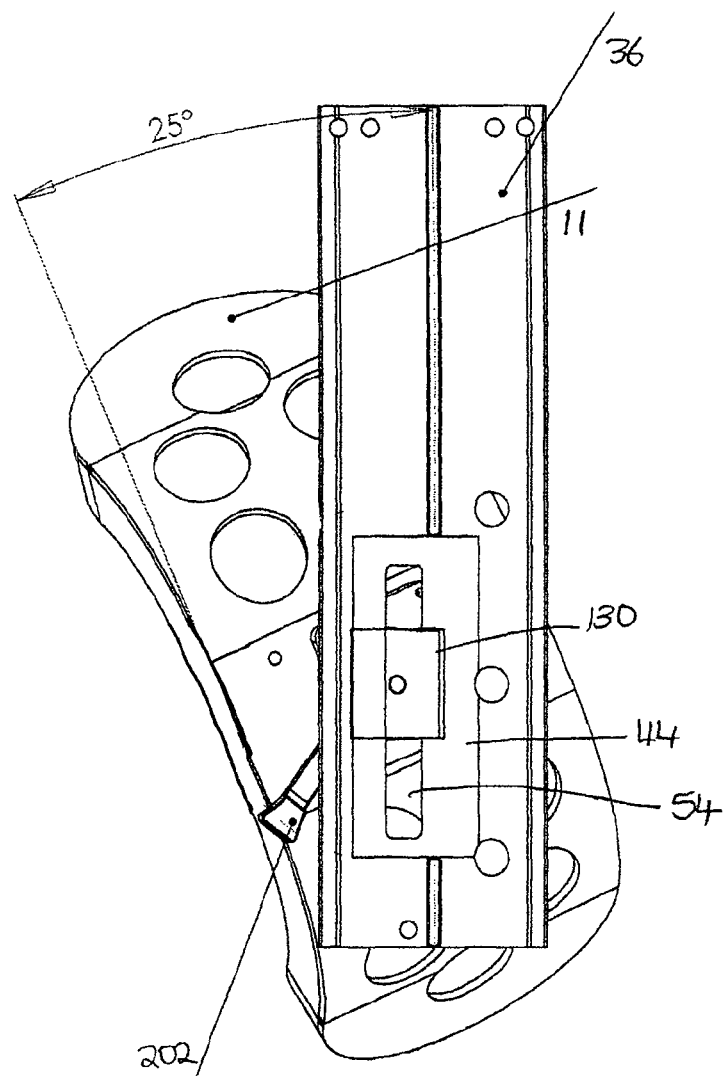
FIG. 28 is a top view of the hand held camera unit of the invention shown without handles and hand grips, illustrating the maximum simultaneous adjustment in both the yaw and the roll axis with the lever in the locked position.
Figure 29:
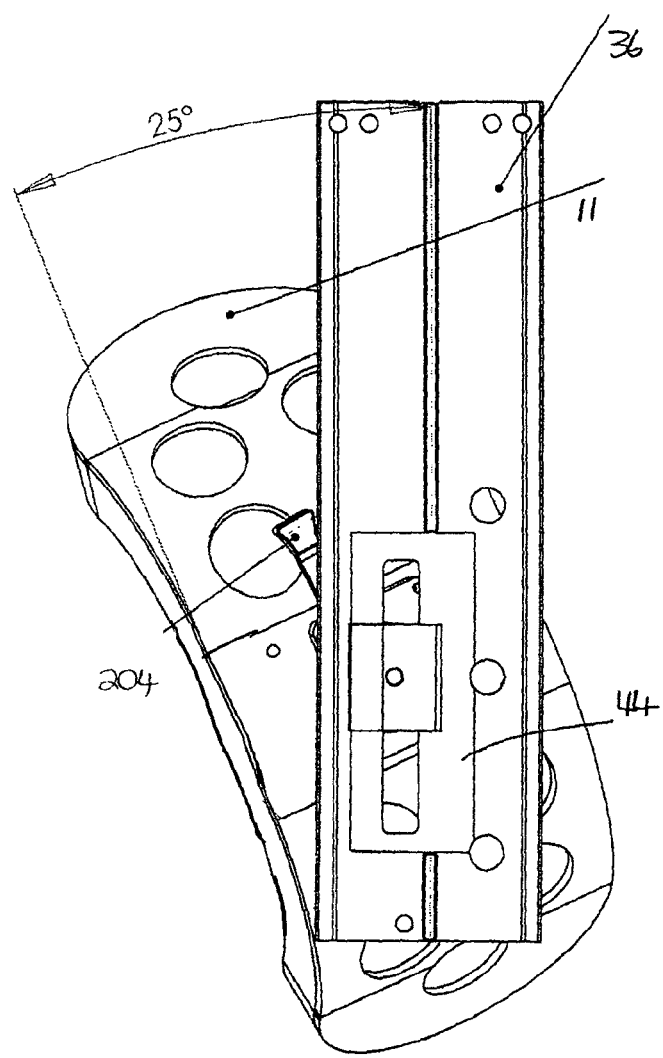
FIG. 29 is a view similar to that shown in FIG. 28 of the drawings but with the lever in the unlocked position.
Figure 30:
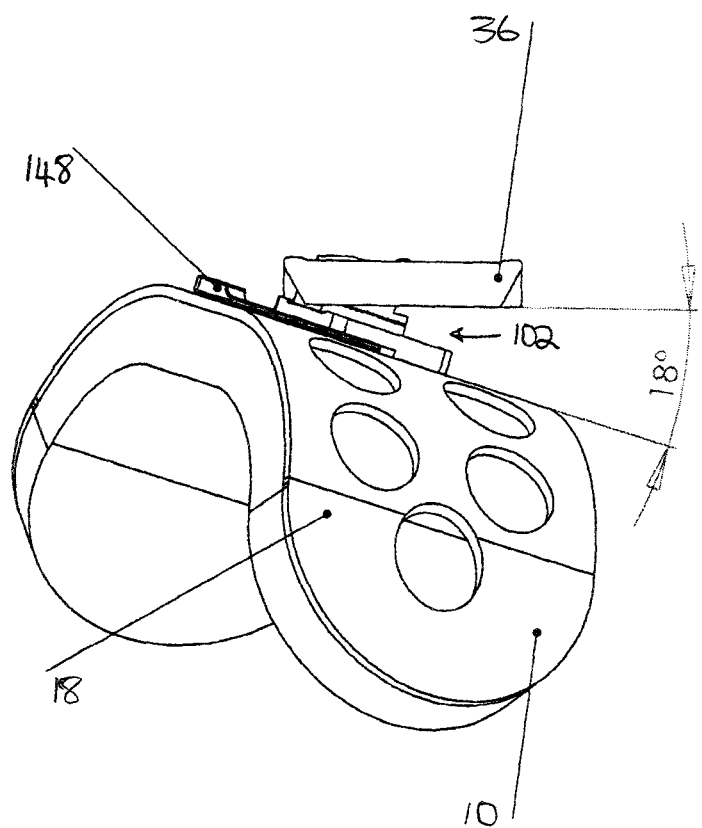
FIG. 30 is a side perspective view of the hand held camera unit shown in FIG. 28 of the drawings, with the dovetail assembly moved to the maximum allowed in the yaw axis and the roll axis.

FIGS. 28 to 30 illustrate maximum simultaneous adjustment in both the yaw and roll axes. In FIG. 28 of the drawings, the locking lever 148 is shown in the locked position 202 and the dovetail assembly is shown with maximum yaw axis adjustment, up to 25° in the present embodiment, and in the roll axis up to 18° in the present embodiment. It should be noted that these amounts of 25 and 18 degrees should not be considered as limiting the scope of the invention, but are merely examples of what may be preferred embodiments that may be practically useful to a camera operator.

In FIG. 29, a view similar to that in FIG. 28 in shown, but with the lever in the unlocked position. With the lever in the unlocked position, the operator is free to move the dovetail assembly 36 in the yaw axis and roll axis to other orientations.

FIG. 30 of the drawings is a side perspective view of the arrangement shown in FIGS. 28 and 29 of the drawings, more clearly illustrating the roll axis rotation achieved between the dovetail assembly 36 and the shoulder assembly 11. The rotation of up to 18° can be clearly seen in this Figure of the drawings.

Figure 31:
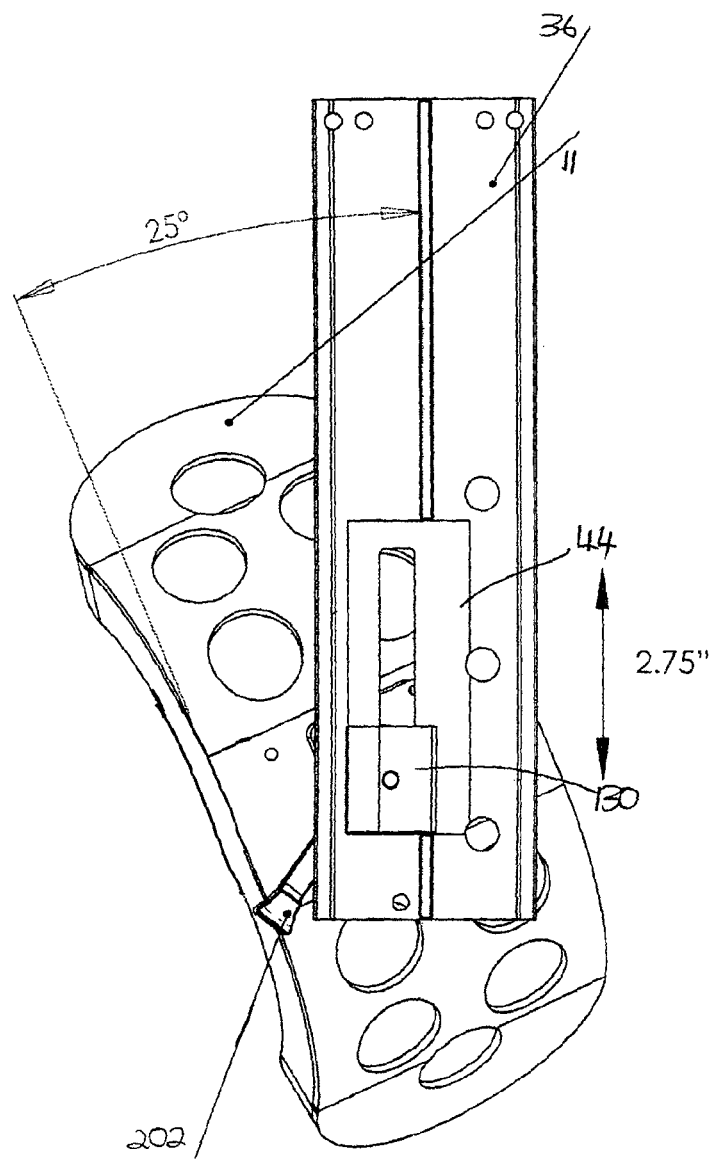
FIG. 31 is a top perspective view of the hand held camera unit of the invention shown without handles and hand grips, illustrating the maximum simultaneous adjustment in both the yaw and the roll axis as well as along the optical axis of the camera, and with the lever in the locked position.

FIGS. 31 to 34 of the drawings show the maximum simultaneous adjustment in the yaw axis, the roll axis and along the optical axis of the camera. In FIG. 31, the unit 10 is shown with the lever in the locked position 202. In this configuration, the dovetail assembly 36 is moved to its forward most position, with the radial convex nut 130 near the rearmost part of the curved recess 44. Further, the radial convex nut 130 is shown up against an edge of the curved recess 44, providing roll axis rotation, in this embodiment up to 18°. The lateral or sideways movement of the radial convex nut 130 within the curved recess 140 is permitted due to the width of the slot 54 which is greater than the diameter of the shaft 142 of the spline head screw 140. This small amount of "play" available to the shaft 142 within the slot 154 allows for the necessary roll axis rotation.

Figure 32:
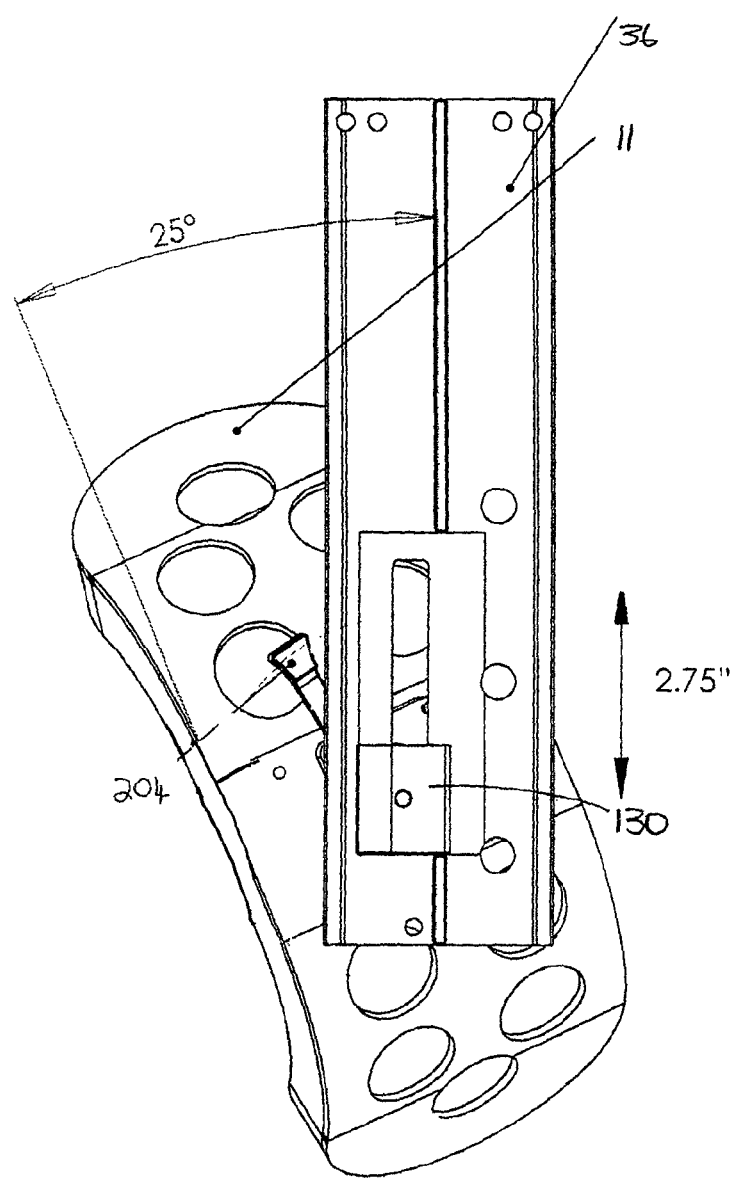
FIG. 32 is a view similar to that shown in FIG. 31 of the drawings but with the lever in the unlocked position.
Figure 33:
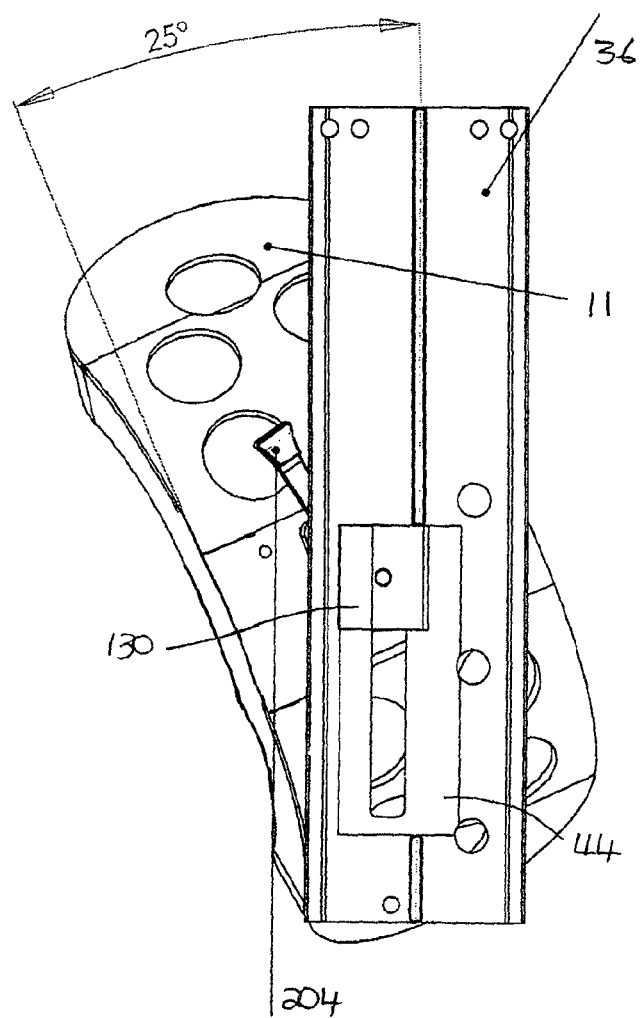
FIG. 33 is a top perspective view of the hand held camera unit shown in FIG. 31 of the drawings, with the dovetail assembly moved along the optical axis of the camera from the maximum forward position to the maximum rearward position, and the lever in the unlocked position.
Figure 34:
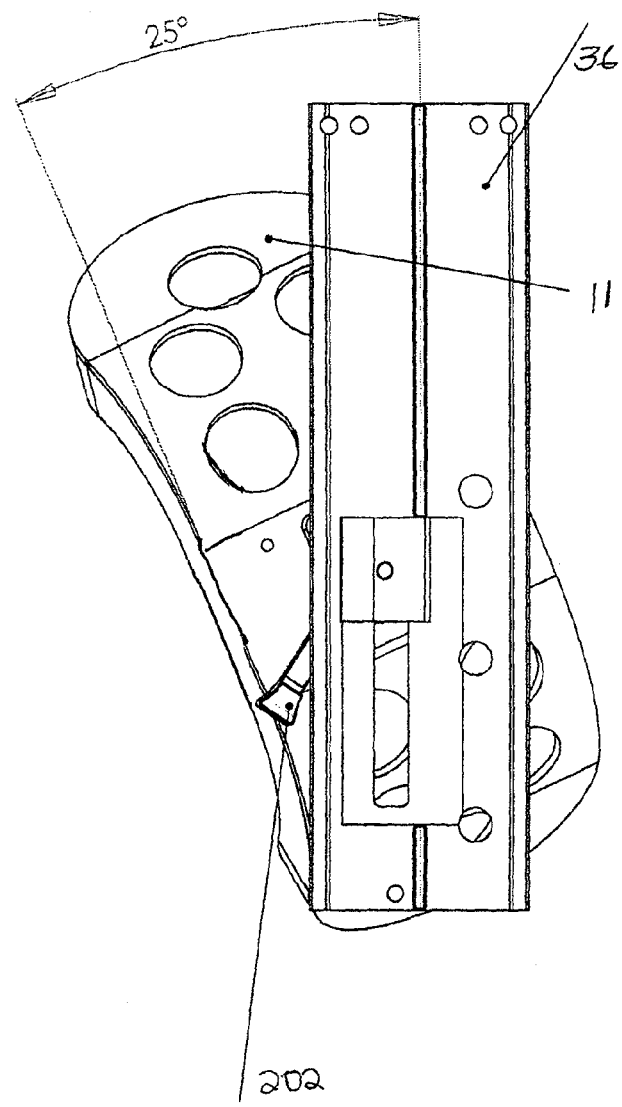
FIG. 34 is a view similar to that shown in FIG. 33 of the drawings, but with the lever moved to the locked position.

In FIG. 32 of the drawings, the lock lever is moved to the unlocked position 204, thereby loosening the grip of the radial convex nut 130 and the concave rosette 174 on the dovetail assembly 36. When in the unlocked position, the dovetail assembly 36 may be axially moved from a forward extending position to a rearward extending position. The rearward position can be seen in FIG. 33 of the drawings, where the radial convex nut 130 is now located at the forward part of the curved recess 44. When the desired position of the dovetail assembly 36 had been attained, the lock lever is moved to the lock position, as seen in FIG. 34, so as to firmly secure the dovetail assembly with respect to the shoulder assembly 11.

Figure 35:
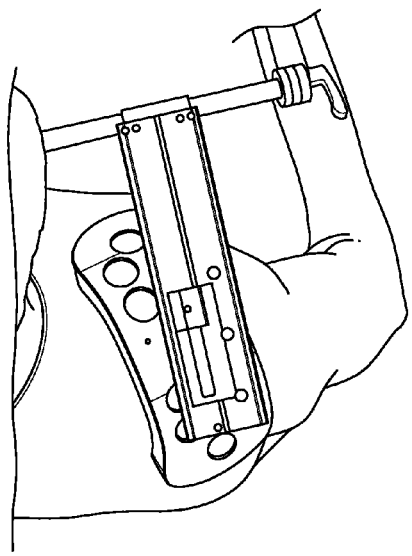
FIG. 35 is a top view of the hand held camera unit in accordance with the invention, shown mounted on the shoulder of the operator thereof.
Figure 36:
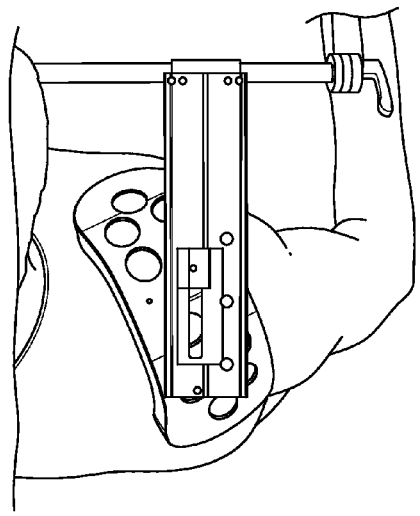
FIG. 36 is a top perspective view of the hand held camera unit in accordance with the invention, shown mounted on the shoulder of the operator thereof.
Figure 37:
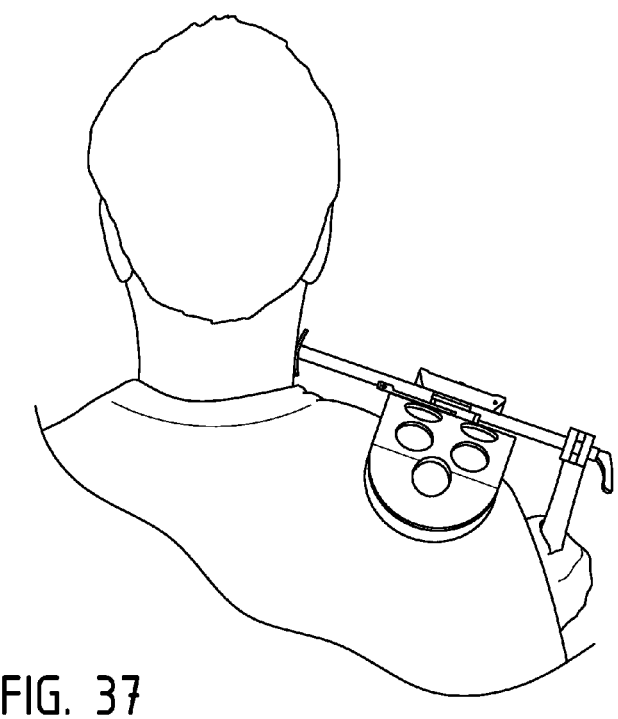
FIG. 37 is a rear view of the hand held camera unit in accordance with the invention, shown mounted on the shoulder of the operator thereof. It is understood that while the handles are shown in a fixed position, many other adjustable positions are possible in accordance with embodiments of the invention disclosed herein.

FIG. 35 of the drawings shows a hand-held camera unit 10 of the invention mounted on the shoulder of a user. It will be seen by the position of the radial convex nut 130 in the curved recess 44, that the dovetail assembly is moved to its rearmost position, and a maximum roll position such as that seen in FIG. 23, has been selected. In FIG. 36 of the drawings, a similar view is shown, but the yaw axis has been slightly changed. In FIG. 36, the dovetail assembly 36 has an axis which is more forward-facing than that shown in FIG. 35 of the drawings. In FIG. 37 of the drawings, yet another orientation of the hand-held camera unit is shown.

It will be appreciated the various modifications to the invention disclosed and illustrated herein may be made within the scope of the invention. Thus, while a preferred embodiment of a connector mechanism has been shown, any other suitable connector mechanism whereby the dovetail assembly or platform can be altered in its orientation and position with respect to the shoulder assembly 11, would be within the scope of the invention.

The invention claimed is:

1. A hand held camera unit comprising:
a shoulder assembly;
a platform assembly for releasably holding a camera; and
a connector mechanism between the shoulder assembly and the platform assembly, the connector mechanism being movable between a locked position wherein the platform assembly is fixed relative to the shoulder assembly and an unlocked position wherein the platform assembly can be selectively moved relative to the shoulder assembly in the roll axis, the yaw axis and in a fore and aft direction.

2. A hand held camera unit as claimed in claim 1 further comprising a handle assembly attached to the platform assembly for moving the platform assembly relative to the shoulder assembly.

3. A hand held camera unit as claimed in claim 2 wherein the handle assembly comprises a center handle selectively attached to the platform assembly, a pair of lateral handles extending from the center handle and movable relative thereto, and a handle grip attached to each of the lateral handles and movable relative thereto, the handle grips for holding by an operator of the unit.

4. A hand held camera unit as claimed in claim 3 wherein the grip handle is attached to the lateral handles in a manner which enables it to rotate in both the vertical and horizontal axes and also to rotate about its axis.

5. A hand held camera unit as claimed in claim 3 wherein the lateral handles telescope so that they can be extended or retracted to a desired length.

6. A hand held camera unit as claimed in claim 1 wherein the shoulder assembly comprises a substantially rigid shoulder frame configured to fit over the shoulder of an operator and a softer shoulder pad thereon for the comfort of the operator.

7. A hand held camera unit as claimed in claim 1 wherein the platform assembly comprises a generally flat rectangular dovetail member, the platform assembly having a curved recess therein, the curved recess having an elongate slot, the curved recess and elongate slot receiving and cooperating with the connector mechanism to effect operation between the locked position and the unlocked position.

8. A hand held camera unit as claimed in claim 7 wherein the connector mechanism comprises a base member fastened to the shoulder assembly, a lower plate member above the base member and having a concave upper surface which engages the curved recess of the platform assembly on one side thereof, an upper plate member above the lower plate member and having a convex surface which engages the curved recess of the platform assembly on the opposing side thereof to that of the lower plate member, the curved recess of the platform assembly being sandwiched between the lower plate member and the upper plate member.

9. A hand held camera unit as claimed in claim 8 further comprising a pan base between the lower plate member and the base member.

10. A hand held camera unit as claimed in claim 9 wherein pan base has an upper surface which is ridged and the lower plate member has a lower surface which is ridged, the ridged surfaces engaging each other to prevent relative rotation when in the locked position.

11. A hand held camera unit as claimed in claim 8 further comprising a spring between the lower plate member and the upper plate member, the spring urging the lower and upper plate members away from each other when in the unlocked position to facilitate movement of the platform assembly relative to the shoulder assembly.

12. A hand held camera unit as claimed in claim 8 further comprising locking means for selectively tightening and loosening the lower plate member and upper plate member relative to each other such that the platform assembly is movable relative to the shoulder assembly when the lower and upper plate members are loosened and the platform assembly is fixed relative to the shoulder assembly when the lower and upper plate members are tightened.

13. A hand held camera unit as claimed in claim 12 wherein the locking means comprises a screw having a splined head which can be tightened to achieve the locked position and loosened to achieve the unlocked position.

14. A hand held camera unit as claimed in claim 13 further comprising a lock lever having a splined aperture, the splined aperture engaging the splined head of the screw whereby appropriate movement of the lock lever rotates the screw to achieve the locked position and the unlocked position respectively.

15. A hand held camera unit as claimed in claim 14 wherein the screw passes through the elongate slot of the curved recess.

16. A hand held camera unit as claimed in claim 1 wherein the connector mechanism comprises a base member fastened to the shoulder assembly, a lower plate member above the base member and having an upper surface which engages the platform assembly on one side thereof, an upper plate member above the lower plate member, the platform assembly being sandwiched between the lower plate member and the upper plate member, and locking means for selectively tightening and loosening the lower plate member and upper plate member relative to each other such that the platform assembly is movable relative to the shoulder assembly when the lower and upper plate members are loosened and the platform assembly is fixed relative to the shoulder assembly when the lower and upper plate members are tightened.

17. A hand held camera unit comprising:
- a shoulder assembly;
- a platform assembly for releasably holding a camera;
- a handle assembly attached to the platform assembly for manipulating the platform assembly relative to the shoulder assembly; and
- a connector mechanism for controlling relative movement between the shoulder assembly and the platform assembly, the connector mechanism being operable between a locked position wherein the platform assembly is fixed relative to the shoulder assembly and an unlocked position wherein the platform assembly can be selectively moved relative to the shoulder assembly in any one or more of the roll axis, the yaw axis and in a fore and aft direction.

* * * * *

UNITED STATES PATENT AND TRADEMARK OFFICE
CERTIFICATE OF CORRECTION

PATENT NO.        : 8,783,973 B2
APPLICATION NO.   : 13/544188
DATED             : July 22, 2014
INVENTOR(S)       : Stephen Pizzo et al.

It is certified that error appears in the above-identified patent and that said Letters Patent is hereby corrected as shown below:

In the Specification

In column 1 at line 8, Change "12," to --18,--.

In column 2 at line 64, Change "the at" to --at the--.

In column 9 at line 1, After "additional" insert --6--.

Signed and Sealed this
Fifth Day of January, 2016

Michelle K. Lee
*Director of the United States Patent and Trademark Office*